United States Patent
Yamashita et al.

(10) Patent No.: US 9,698,699 B2
(45) Date of Patent: Jul. 4, 2017

(54) DIRECT AC POWER CONVERSION DEVICE

(71) Applicant: DAIKIN INDUSTRIES, LTD., Osaka-shi, Osaka (JP)

(72) Inventors: Naoya Yamashita, Kusatsu (JP); Toshiyuki Maeda, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 57 days.

(21) Appl. No.: 14/431,691

(22) PCT Filed: Sep. 26, 2013

(86) PCT No.: PCT/JP2013/076106
§ 371 (c)(1),
(2) Date: Mar. 26, 2015

(87) PCT Pub. No.: WO2014/050987
PCT Pub. Date: Apr. 3, 2014

(65) Prior Publication Data
US 2015/0244282 A1     Aug. 27, 2015

(30) Foreign Application Priority Data

Sep. 27, 2012  (JP) .................................. 2012-214270

(51) Int. Cl.
*H02M 5/458*     (2006.01)
*H02M 1/42*     (2007.01)
(Continued)

(52) U.S. Cl.
CPC ......... *H02M 5/458* (2013.01); *H02M 1/4225* (2013.01); *H02M 7/08* (2013.01); *H02J 3/36* (2013.01); *Y02B 70/126* (2013.01)

(58) Field of Classification Search
CPC .... H02M 5/4585; H02M 5/458; H02M 5/447; H02M 3/156; H02M 7/08; H02J 3/36; H02J 1/102; Y02B 70/126; G05F 1/33
(Continued)

(56) References Cited

U.S. PATENT DOCUMENTS

| 4,437,146 A | * | 3/1984 | Carpenter | H02M 1/4225 323/222 |
| 5,235,504 A | * | 8/1993 | Sood | H02M 1/4208 323/224 |
| 6,906,503 B2 | * | 6/2005 | Lopez-Santillana | H02M 1/4225 323/222 |

FOREIGN PATENT DOCUMENTS

| CN | 101499771 A | 8/2009 |
| JP | 9-37476 A | 2/1997 |

(Continued)

OTHER PUBLICATIONS

Ohnuma et al., "Experimental Verification of Single Phase to Three Phase Converter Using an Active Buffer circuit with a Charge Circuit," IEEJ 2010 Industry Applications Society Conference 1-124, 2010, pp. 587-590, with an English abstract.

*Primary Examiner* — Nguyen Tran
(74) *Attorney, Agent, or Firm* — Birch, Stewart, Kolasch & Birch, LLP

(57) ABSTRACT

A DC link has first and second power supply lines. A first rectifying circuit has a plurality of input terminals that input an AC voltage and a pair of output terminals connected to the DC link. An inverter converts a voltage applied to the DC link into another AC voltage. A boost chopper has a capacitor at an output stage. A switch switches discharge and non-discharge from the capacitor to the DC link. In the boost chopper, charge into the capacitor is performed at least at a
(Continued)

first period. The first period is a part of a period during which a discharge duty as a time ratio of continuity of the switch is larger than 0.

19 Claims, 17 Drawing Sheets

(51) Int. Cl.
*H02M 7/08* (2006.01)
*H02J 3/36* (2006.01)

(58) Field of Classification Search
USPC ... 363/34, 35, 36–37, 81–82, 89–90, 65, 67, 363/69–70; 323/207, 222
See application file for complete search history.

(56) References Cited

FOREIGN PATENT DOCUMENTS

| JP | 2011-193678 A | 9/2011 |
| JP | 2012-105481 A | 5/2012 |
| JP | 2012-135184 A | 7/2012 |

* cited by examiner

F I G. 3
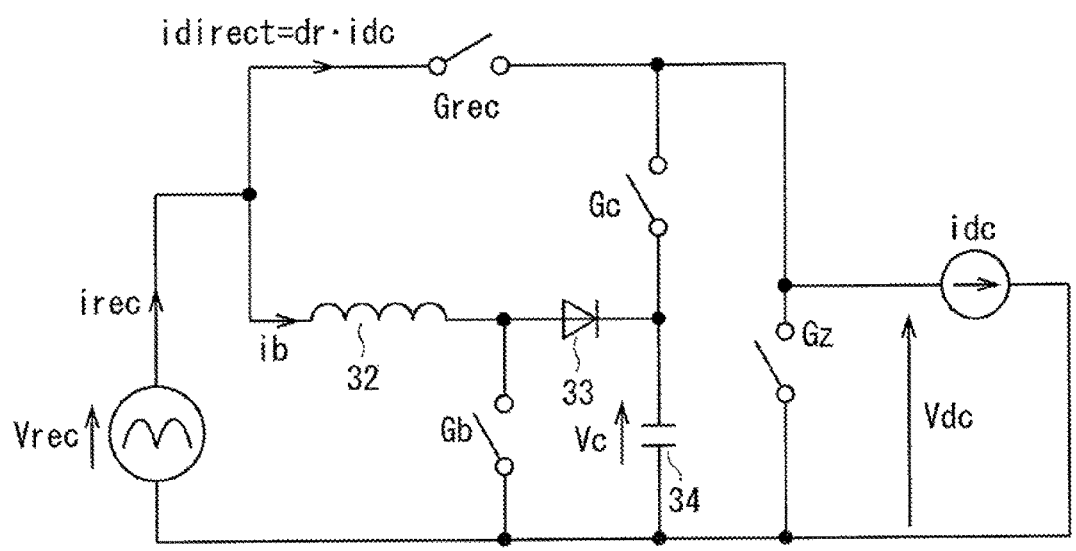

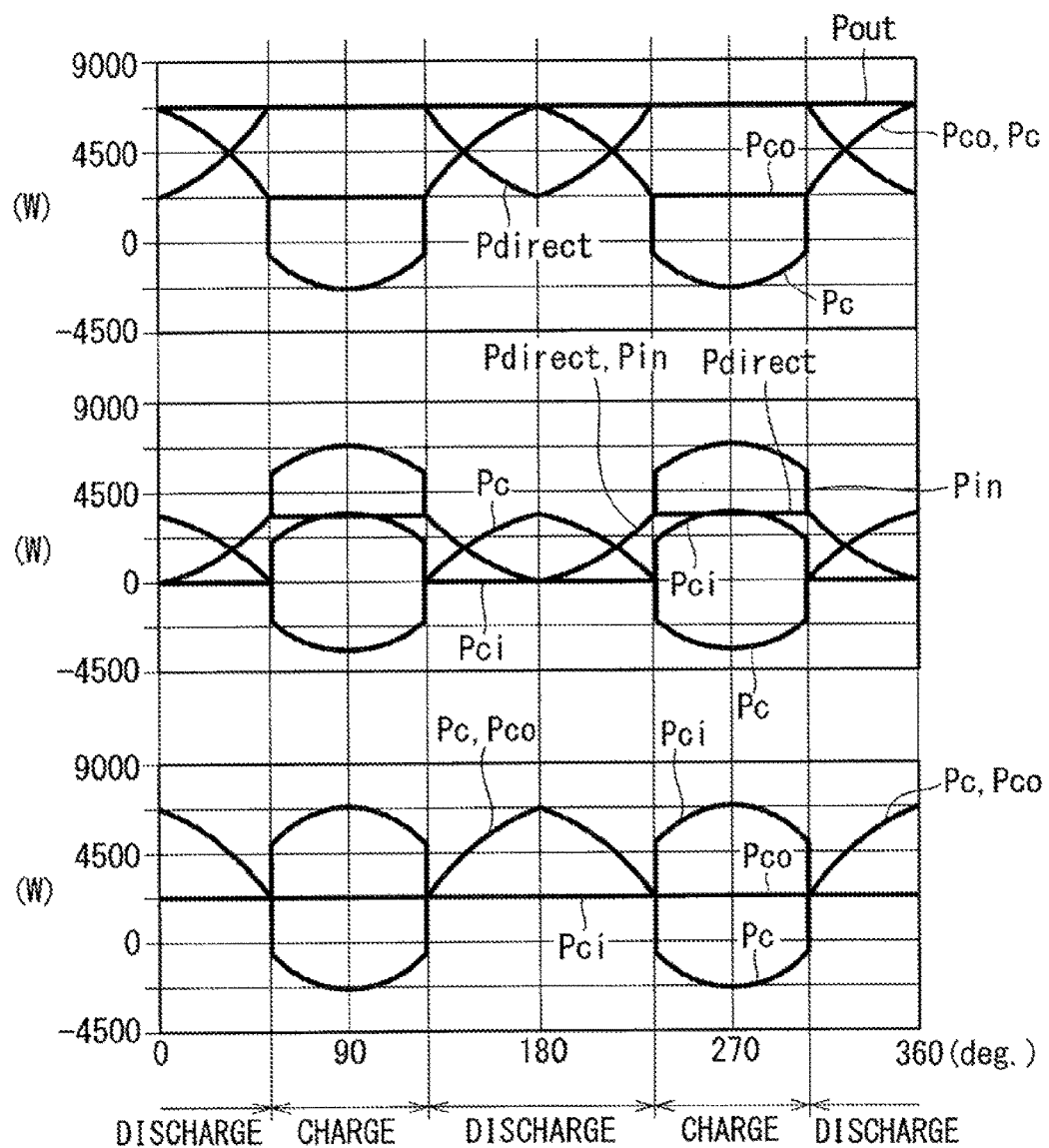
F I G. 1 3

DIRECT AC POWER CONVERSION DEVICE

TECHNICAL FIELD

The present invention relates to a direct AC power converter, and particularly relates to a configuration having a rectifying circuit, an inverter, and a boost chopper.

BACKGROUND ART

Japanese Patent Application Laid-Open No. 2011-193678, Japanese Patent Application Laid-Open No. 2012-135184 and Ohnuma, Itoh: "Experimental Verification of Single Phase to Three Phase Converter Using an Active Buffer circuit with a Charge Circuit", IEEJ 2010 Industry Applications Society Conference 1-124, pp. 1-587-590 (2010) introduce direct AC power converters. In each of these direct AC power converters, a boost chopper is used and receives an electric power from a rectifying circuit and supplies the electric power to an inverter so that pulsation of an instantaneous power is reduced.

SUMMARY OF INVENTION

Problems to be Solved by the Invention

In the techniques introduced in these documents, however, a period of charge from a rectifying circuit to a capacitor, and a period of discharge from the capacitor to the inverter are set alternately at each ¼ of a cycle of an input AC voltage. For this reason, a magnitude of an output voltage remains at $1/\sqrt{2}$ times a crest value of the input AC voltage.

Further, an operation of the boost chopper is performed in a so-called non-continuous mode, and thus a peak current to flow in an inductor included in the boost chopper tends to be large.

It is, therefore, an object of the present invention to reduce a peak current to flow in an inductor included in a boost chopper. Further, it is another object of the present invention to provide a technique that makes an output voltage from a direct AC power converter higher than a conventional technique.

Means for Solving the Problems

A direct AC power converter of the present invention includes a DC link (7), a first rectifying circuit (5, 51), a boost chopper (3), and a switch (41).

The DC link has a first power supply line (L1), and a second power supply line (L2) to which an electric potential lower than an electric potential of the first power supply line is applied.

The first rectifying circuit has a plurality of input terminals into which an AC voltage is input, and a pair of output terminals (51c and 51d) each of which is connected to the DC link.

The inverter converters the voltage applied to the DC link into another AC voltage.

The boost chopper has a capacitor (34) at an output stage.

The switch switches discharge and non-discharge from the capacitor to the DC link.

In a first aspect of a direct AC power converter according to the present invention, charge into the capacitor is performed in the boost chopper at least at a first period that is a part of a period during which a discharge duty (dc) is larger than 0.

The discharge duty is a time ratio at which the switch is conductive.

In a second aspect of the direct AC power converter according to the present invention, in the first aspect, the capacitor is charged in the boost chopper at the first period, and a part or entire of the period during which the discharge duty is 0.

In a third aspect of the direct AC power converter according to the present invention, in any one of the first and second aspects, the capacitor (34) is charged by a charge power (Pci) and discharged by a discharge power (Pco) at the first period, and the first period has a period during which the charge power is larger than the discharge power, and a period during which the discharge power is larger than the charge power.

In a fourth aspect of the direct AC power converter according to the present invention, in any one of the first to third aspects, a virtual DC link voltage (Vdc) is larger than $1/\sqrt{2}$ times the rectified voltage.

The virtual DC link voltage is expressed by a sum of a product (dc·Vc) of the discharge duty (dc) and a voltage between both ends (Vc) of the capacitor (34), and a product (dr·Vrec) of a rectifying duty (dr) and a rectified voltage (Vrec) of the AC voltage.

The rectifying duty takes a value obtained by subtracting a sum of the discharge duty and a zero voltage duty (dz) from 1.

The zero voltage duty is a time ratio for the inverter (6) to adopt a zero voltage vector regardless of a magnitude of a voltage to be output from the inverter (6).

In a fifth aspect of the direct AC power converter according to the present invention, in the fourth aspect, the discharge duty for that makes the zero voltage duty (dz) minimum is set based on a command value (irec*) of a rectified current (irec) being a sum of an electric current (ib) flowing in the boost chopper (3) and an electric current (idirect) flowing from the first rectifying circuit to the inverter (6), a command value (Vdc*) of the virtual DC link voltage (Vdc), the voltage between both ends (Vc) of the capacitor, the rectified voltage (Vrec), and an electric current (idc) to be input into the inverter (6).

In a sixth aspect of the direct AC power converter according to the present invention, in the fifth aspect, when the virtual DC link voltage (Vdc) is larger than the rectified voltage (Vrec) and the command value (irec*) of the rectified current (irec) is a predetermined value (dr_max) or more, the rectifying duty (dr) takes the predetermined value, and the discharge duty (dc) takes a value obtained by subtracting the predetermined value from 1.

The predetermined value is a value ((Vdc*−Vc)/(Vrec−Vc)) obtained by dividing a value obtained by subtracting the voltage between both ends (Vc) of the capacitor from the command value (Vdc*) of a virtual DC link voltage (Vdc) by a value obtained by subtracting the voltage between both ends (Vc) from the rectified voltage (Vrec).

In a seventh aspect of the direct AC power converter according to the present invention, in any of the first to sixth aspects, further includes a second rectifying circuit (52) for inputting the rectified voltage (Vrec) into the boost chopper (3).

In an eighth aspect of the direct AC power converter according to the present invention, in any of the first to sixth aspects, the pair of output terminals of the first rectifying circuit is connected to an input side of the boost chopper.

In a ninth aspect of the direct AC power converter according to the present invention, in any of the first and third to eighth aspects, the discharge duty (dc) is always positive.

A tenth aspect of the direct AC power converter according to the present invention, in any of the first to ninth aspects, further includes a diode connected in parallel with the switch (41), the diode making a direction of charging the capacitor (34) from the DC link (7) being a forward direction.

Effects of the Invention

The capacitor is charged in the boost chopper at least at a part of the period during which the discharge duty is larger than 0, so that an average value of a maximum value of a voltage capable of being output from the inverter at a cycle of controlling the switching of the inverter can exceed $1/\sqrt{2}$ time a crest value of an AC voltage.

In another manner, even when the average value does not exceed $1/\sqrt{2}$ times the crest value of the AC voltage, a period of charging the capacitor can be set to be longer than the period in a conventional technique. For this reason, a peak value of an electric current to flow in an inductor included in the boost chopper can be reduced so as to be smaller than the value in a conventional technique.

Objects, features, aspects and advantages of the present invention will be apparent from the following detailed description taken in conjunction with the accompanying drawings.

BRIEF DESCRIPTION OF DRAWINGS

FIG. 3 is an equivalent circuit of the direct AC power converter according to the embodiment;

FIG. 13 is a graph showing waveforms of specifications of the comparative example 2;

DESCRIPTION OF EMBODIMENTS

Figure 1:
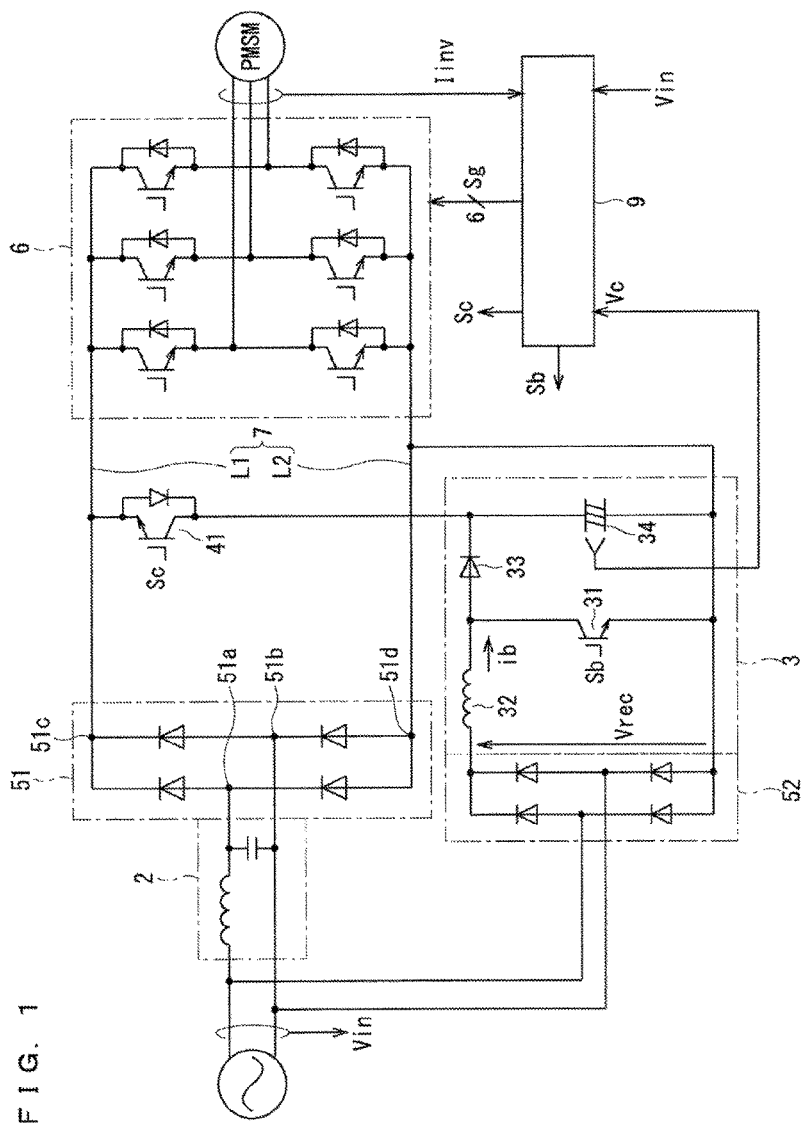
FIG. 1 is a circuit diagram illustrating a configuration of a direct AC power converter according to an embodiment.

FIG. 1 is a circuit diagram illustrating a configuration of a direct AC power converter according to an embodiment. The direct AC power converter includes a DC link 7, rectifying circuits 51 and 52, a boost chopper 3, a switch 41, and an inverter 6.

The DC link 7 has power supply lines L1 and L2. An electric potential lower than an electric potential of the power supply line L1 is applied to the power supply line L2.

The rectifying circuit 51 has input terminals 51a and 51b that input an AC voltage Vin, and a pair of output terminals 51c and 51d to be connected to the power supply lines L1 and L2, respectively. The rectifying circuit 51 is of a full-wave rectification type, and a case where it is formed by a diode bridge is illustrated here.

In FIG. 1, illustrated is a state where an AC voltage Vin is supplied to the rectifying circuit 51 from a single-phase AC power supply via a filter circuit 2. However, since the filter circuit 2 is provided in order to cut a harmonic noise, a cutoff frequency of the harmonic noise is higher than a frequency of the AC voltage Vin. Since the operations of respective sections described below are hardly influenced by the function of the filter circuit 2, the description hereinafter excluding the operation of the filter circuit 2 is given.

An operation of a switch 41, and switching operations of a boost chopper 3 and an inverter 6 are controlled by a controller 9. It can be understood that the controller 9 is also provided to the direct AC power converter.

The inverter 6 converts the voltage applied to the DC link 7 into another AC voltage. The inverter 6 is constituted so as to output a three-phase AC voltage to a permanent-magnet synchronous motor PMSM as an inductive load. The inverter 6 is a voltage inverter that operates under instantaneous spatial vector control, and can adopt a publicly-known configuration. The inverter 6 outputs a three-phase current Iinv to the permanent-magnet synchronous motor PMSM.

The boost chopper 3 has a capacitor 34 at an output stage of the boost chopper 3. More concretely, a rectified voltage Vrec of the AC voltage Vin is applied to the boost chopper 3. The rectified voltage Vrec is generated by the rectifying circuit 52 of a full-wave rectification type. A case where the rectifying circuit 52 is formed by the diode bridge is illustrated here.

The boost chopper 3 has an inductor 32, a switch 31, and a diode 33 besides the capacitor 34. The rectified voltage Vrec is applied between one end of the inductor 32 and one end of the switch 31. The other end of the inductor 32, the other end of the switch 31, and an anode of the diode 33 are connected to each other. The capacitor 34 is connected between a cathode of the diode 33 and the one end of the switch 31. For example, an insulated gate bipolar transistor is adopted as the switch 31.

Such a configuration is publicly known as the boost chopper, and thus its detailed operation is omitted.

However, it is noted that the switch 31 is conductive/non-conductive according to activity/non-activity of a control signal Sb, and that a boost duty db that is a time ratio of conductivity of the switch 31 is determined by a command value ib* of an electric current ib (detailed later) to flow in the inductor 32, a capacitor voltage Vc to be applied to the capacitor 34, and the rectified voltage Vrec.

The switch 41 performs discharge/non-discharge from the capacitor 34 to the DC link 7 according to activity/non-activity of a control signal Sc. More concretely, the switch 41 is connected between the power supply lines L1 and L2 in series with respect to the capacitor 34.

Normally, the operation of the boost chopper 3 makes the capacitor voltage Vc higher than the rectified voltage Vrec. The switch 41, therefore, has a switch device for controlling whether an electric current is allowed to flow from the boost chopper 3 (more concretely, from the capacitor 34) to the power supply line L1. For example, an insulated gate bipolar transistor is adopted as the switch device.

Further, a diode where a forward direction is a direction from the DC link 7 to the boost chopper 3 (more concretely, from the power supply line L1 to the capacitor 34) is desirably included in order to charge the capacitor 34 with a regenerated current from the inverter 6.

The controller 9 inputs the AC voltage Vin (more accurately, a signal indicating its waveform: the same applies hereafter), an electric current Iinv to be output from the inverter 6, and the capacitor voltage Vc, and outputs control signals Sb, Sc, and Sg. The control signal Sg is a signal for controlling switching of the inverter 6, and is a signal group composed of 6 (=3×2) signals because a case where the inverter 6 outputs a three-phase voltage is illustrated here.

Figure 2:
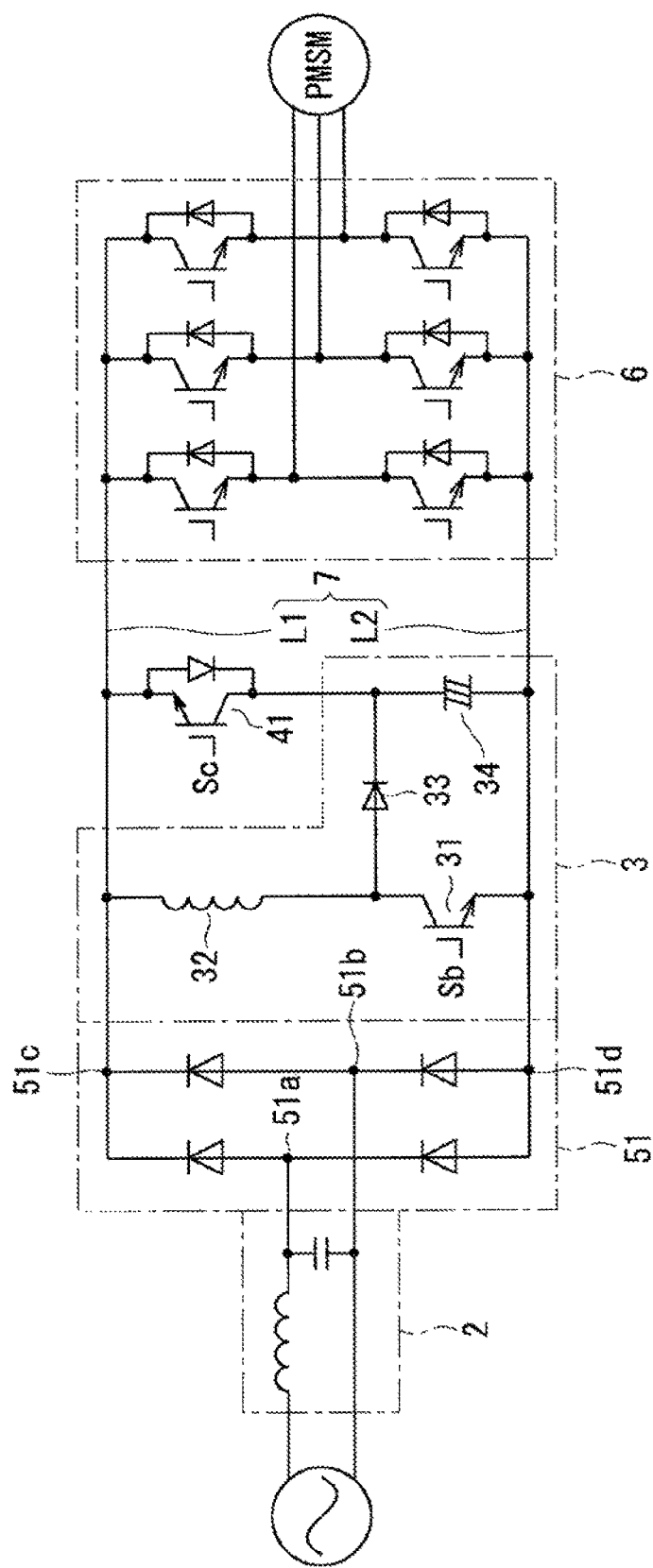
FIG. 2 is a circuit diagram illustrating another configuration of the direct AC power converter according to the embodiment.

FIG. 2 is a circuit diagram illustrating another configuration of the direct AC power converter according to this embodiment. In comparison with the configuration shown in FIG. 1, the rectifying circuit 51 concurrently serves as the rectifying circuit 52. That is to say, the pair of output terminals 51c and 51d of the rectifying circuit 5 is connected to an input side of the boost chopper 3. In this case, differently from the configuration shown in FIG. 1, the rectified voltage Vrec is not always applied to the boost chopper 3. This is because the other end of the inductor 32 is connected to the switch 41 via the power supply line L1, and the capacitor voltage Vc may be applied to the boost chopper 3 according to operating circumstances of the switch 41.

However, since both FIG. 1 and FIG. 2 are treated equivalently in an equivalent circuit described below, a control method described below is common. The equivalent circuit is first described below.

FIG. 3 is the equivalent circuit of the direct AC power converter shown in FIG. 1 and FIG. 2. The rectified voltage Vrec is expressed as a voltage source, and thus a switch Grec indicates whether the rectifying circuit 51 is conductive or not. Further, the switches 31 and 41 are indicated by switches Gb and Gc, respectively. However, the regenerated current from the inverter 6 is not taken into consideration, and the diode of the switch 41 is not taken into consideration.

The inverter 6 and its load are expressed as current sources for flowing a DC current idc into the inverter 6. The inverter 6 is operated by a so-called zero voltage vector in a state that a switch Gz is conductive. When the inverter 6 is operated by the zero voltage vector, the inverter 6 short-circuits with respect to an inductive load with any one of the power supply lines L1 and L2, and thus does not receive an electric current from the DC link 7.

On the other hand, the inverter 6 is allowed to be operated by any vectors other than the zero voltage vector when the inverter 6 receives an electric current from the DC link 7. Therefore, the inverter 6 is operated by any vectors other than the zero voltage vector when the switch Gz is non-conductive.

When the capacitor voltage Vc higher than the rectified voltage Vrec is applied to the DC link 7, an electric current does not flow in the DC link 7 from the rectifying circuit 51. That is to say, when the switch Gc is conductive, the switch Grec is not conductive.

As described in Japanese Patent Application Laid-Open No. 2011-193678 and Japanese Patent Application Laid-Open No. 2012-135184, when time ratios of the conductivity of the switches Grec, Gc, and Gz are a rectifying duty dr, a discharge duty dc, and a zero voltage duty dz, respectively, a sum of these three is 1. That is to say, the following formula (1) holds. These time ratios are time ratios in a shorter cycle than a cycle of the AC voltage Vin, and time ratios relating to a carrier cycle controlled with approximation that the AC voltage Vin is constant.

$$dr+dc+dz=1 \tag{1}$$

The zero voltage duty dz is a time ratio corresponding to a period during which the inverter 6 adopts the zero voltage vector regardless of a magnitude of a voltage to be output. Further, the discharge duty dc is a time ratio of the conductivity of the switch 41.

The rectifying duty dr is a time ratio of the conductivity of the rectifying circuit 51, and it is found from the formula (1) that it takes a value obtained by subtracting a sum of the discharge duty dc and the zero voltage duty dz from 1.

When the switch 41 is conductive, the capacitor voltage Vc is adopted, and when the switch 41 is not conductive, the rectified voltage Vrec is adopted as the DC voltage to be applied to the DC link 7. Therefore, a virtual voltage (in this application, "a virtual DC link voltage") Vdc is determined according to the following formula (2).

$$Vdc=dr \cdot Vrec+dc \cdot Vc \tag{2}$$

That is to say, the virtual DC link voltage Vdc is expressed by a sum of a product (dc·Vc) of the discharge duty dc and the capacitor voltage Vc, and a product (dr·Vrec) of the rectifying duty dr and the rectified voltage Vrec. This can be understood as an average of maximum values of voltages capable of being output from the inverter 6 in a cycle of control of a switching operation on the switch 41 or the inverter 6. FIG. 3 shows the virtual DC link voltage Vdc as a voltage to be generated at both ends of a current source idc (this causes the DC current idc to flow) representing the inverter 6 and the load of the inverter 6.

In such an equivalent circuit, an electric current from the voltage source indicating the rectified voltage Vrec (in this application, "a rectified current") irec is understood as a sum of the electric current ib to flow in the inductor 32 (included in the boost chopper 3) and an electric current idirect to flow from the rectifying circuit 51 into the inverter 6 in the actual configuration.

In the configuration shown in FIG. 1, the rectified current irec is not directly indicated. In FIG. 1, the electric current idirect is an electric current that flows from the rectifying circuit 51 into the DC link 7, and the electric current ib is an electric current that flows from the rectifying circuit 52 into the boost chopper 3.

On the other hand, in a configuration shown in FIG. 2, the rectified current irec is output from the output terminal 51c, and a part of the rectified current irec to flow into the inductor 32 becomes the electric current ib.

Since the switch Grec indicates the conductivity/non-conductivity of the rectifying circuit 51, the rectifying duty dr that is the time ratio of the conductivity is expressed as a value obtained by dividing the electric current idirect by the DC current idc. Therefore, the following formula (3) holds.

$$irec=dr \cdot idc+ib \tag{3}$$

In Japanese Patent Application Laid-Open No. 2011-193678, Japanese Patent Application Laid-Open No. 2012-135184 and Ohnuma, Itoh: "Experimental Verification of Single Phase to Three Phase Converter Using an Active Buffer circuit with a Charge Circuit", IEEJ 2010 Industry Applications Society Conference 1-124, pp. 1-587-590 (2010), a period during which the electric current ib is allowed to flow is excluded from a period (providing period) during which an electric power is provided from the capacitor 34 to the DC link 7. Furthermore, the providing period and a period during which the capacitor 34 receives the electric power from the DC link 7 (receiving period) are set alternately in each ¼ of the cycle of the AC voltage Vin. For this reason, the virtual DC link voltage Vdc does not exceed $1/\sqrt{2}$ times a crest value of the AC voltage.

However, even at the providing period, the capacitor 34 does not always perform the discharge, and is discharged at the discharge duty dc. Therefore, a period during which the capacitor 34 can be charged is included even in the providing period. On the other hand, the providing period is necessary in a period during which the virtual DC link voltage Vdc is larger than the rectified voltage Vrec. This is because that, even with dc=0, as is clear from the formula (2), the virtual DC link voltage Vdc can be determined only by the rectified voltage Vrec, the rectifying duty dr, and the zero voltage duty dz with dz>0 when the virtual DC link voltage Vdc is smaller than the rectified voltage Vrec.

In other words, on at least a part of the period during which the virtual DC link voltage Vdc is larger than the rectified voltage Vrec (dc>0 at this period: a reason for this is described later), the capacitor 34 is charged in the boost chopper 3 so that the capacitor 34 is supplemented with an electric power. As a result, the virtual DC link voltage Vdc can exceed $1/\sqrt{2}$ times the crest value of the AC voltage Vin. Needless to say, at a part or entire of the period during which dc=0, the capacitor 34 can be charged.

In another manner, even when the virtual DC link voltage Vdc does not exceed $1/\sqrt{2}$ times the crest value of the AC voltage Vin, the period during which the capacitor 34 is charged can be set to be longer than a period in a conventional technique. For this reason, a peak value of the electric current ib to flow in the inductor 32 can be reduced to be lower comparing to the conventional technique.

Further details are described below. In order to reduce a loss in the boost chopper 3 and a rated current required by the inductor 32, it is desirable to reduce the discharge duty dc.

A case where the rectified current irec is larger than the electric current idirect is first considered. According to the formula (3), this is a case where a margin exist for flowing the electric current ib in the boost chopper 3, and a magnitude of the rectifying duty dr is not limited by the rectified current irec. In this case, a case where the virtual DC link voltage Vdc is made to be the rectified voltage Vrec or less is further considered as a first case. The first case is realized so that dc=0, and dz>0. Concretely, when dc=0 in the formulas (1) and (2), the rectifying duty dr and the zero voltage duty dz in the first case are determined by the following formula (4). At this time, the capacitor 34 is not discharged via the switch 41.

$$dr = Vdc/Vrec, dz = 1 - Vdc/Vrec \quad (4)$$

In other words, when a command value Vdc* of the virtual DC link voltage Vdc is set, the rectifying duty dr should be set to a ratio of the command value Vdc* to the rectified voltage Vrec (Vdc*/Vrec), and the zero voltage duty dz should be set to a value obtained by subtracting the ratio from 1 in order to make the virtual DC link voltage Vdc follow the command value Vdc* with the discharge duty dc being zero in the first case.

Further, it is found that the zero voltage duty dz also becomes minimum here. This is because in order to match the virtual DC link voltage Vdc with the command value Vdc* even when the discharge duty dc increases, the zero voltage duty dz has to be increased according to the formula (2).

In other words, in the first case, it can be also grasped that to set the rectifying duty dr to the ratio (Vdc*/Vrec) means to set the discharge duty dc for making the zero voltage duty dz minimum and to set that value to 0.

When the above control is made in the first case, the capacitor 34 is not discharged.

A case where the rectified current irec is larger than the electric current idirect and the virtual DC link voltage Vdc is larger than the rectified voltage Vrec is considered as a second case. In this case, it is obvious from the formula (2) that the discharge from the capacitor 34 to the DC link 7 has to be performed. That is to say, the discharge duty dc is set positive. It is also obvious from the formula (2) that the virtual DC link voltage Vdc has to be the capacitor voltage Vc or less.

The zero voltage duty dz that does not contribute to a rise in the virtual DC link voltage Vdc is necessary to be reduced in order to reduce the discharge duty dc so that the loss and the rated current are reduced. In the second case, similarly to the first case, since the magnitude of the rectifying duty dr is not limited by the rectified current irec, the DC current idc can be fed by the rectified current irec. Therefore, the zero voltage duty dz can be reduced to zero.

According to this and the formula (1), the formula (2) can be deformed into the following formula (5).

$$Vdc = dr \cdot Vrec + (1-dr) \cdot Vc \therefore dr = (Vdc-Vc)/(Vrec-Vc) \quad (5)$$

In other words, it is found that in order to make the virtual DC link voltage Vdc follow the command value Vdc* in the second case, the rectifying duty dr should be set to a ratio (Vdc*−Vc)/(Vrec−Vc), and the discharge duty dc should be set to a value obtained by subtracting the ratio from 1.

In the second case, it can be also grasped that to set the rectifying duty dr in the above manner means to set the discharge duty dc for making the zero voltage duty dz minimum and to set its value to (1−dr). This is because the zero voltage duty dz reduces to zero also in this case.

It can be grasped that the control of the each duty means to set the discharge duty dc for making the zero voltage duty dz minimum based on two viewpoints. The first viewpoint is whether the rectified current irec is larger than the electric current idirect or not, namely, whether a command value irec* of the rectified current irec is set to be larger than an electric current irect or not. The second viewpoint is whether the virtual DC link voltage Vdc is larger than the rectified voltage Vrec or not, namely, whether the command value Vdc* is larger than the rectified voltage Vrec or not.

There is a margin for flowing the electric current ib from the rectifying circuit 52 in the circuit shown in FIG. 1, and from the rectifying circuit 51 in the circuit shown in FIG. 2 respectively. Therefore, when the DC current idc is estimated, with an estimated value idc^, the command value ib* of the electric current ib is set according to the following formula (6) in consideration of the formula (3).

$$ib^* = irec^* - dr\_max \cdot idc\hat{} \quad (6)$$

Here, dr_max indicates the rectifying duty dr respectively expressed by the formula (4) in the first case and the formula (5) in the second case.

Particularly like the second case, when the virtual DC link voltage Vdc is larger than the rectified voltage Vrec, this period becomes the providing period during which the discharge is performed from the capacitor 34 to the DC link 7 at the discharge duty dc. Not only the discharge but also the charge of the capacitor 34 is performed by flowing of the electric current ib according to the command value ib* expressed by the formula (6) at the providing period.

In this embodiment, therefore, a period corresponding to the second case is called "charge/discharge zone". On the contrary, a period corresponding to the first case is called "charge zone" in this embodiment because not the discharge but only the charge of the capacitor 34 is performed.

A publicly-known method can be employed for a switching operation to be performed by a switch Gb (switch 31) using the electric current ib flowing in the boost chopper 3 to charge the capacitor 34 to the capacitor voltage Vc. This method may adopt a so-called current discontinuous mode, or a critical mode, or a current continuous mode.

A case where the rectified current irec is the electric current idirect or less is considered as a third case. With reference to the formula (3), it is a case where a margin of flowing the electric current ib cannot exit. Or it is the case, with reference to the formula (6), where ib*<0, namely, the following formula (7) holds.

$$irec^* < dr\_max \cdot \hat{idc} \qquad (7)$$

Since the electric current ib does not actually take a negative value, however, the rectifying duty dr that takes a value smaller than dr_max is adopted under a condition of the formula (7), so that the formula (3) is made to hold under conditions where irec≥0, dr≥0, idc>0, and ib≥0.

The command value ib* of the electric current ib is set to 0 so that ib≥0 at all times. That is to say, at a period during which the formula (7) holds, the capacitor 34 is not charged, and the capacitor 34 is discharged by the discharge duty dc determined below. In this embodiment, therefore, the period during which the formula (7) holds is called "discharge zone".

The rectifying duty dr is determined by using a command value irec* and the estimated value $\hat{idc}$ according to the following formula (8) in consideration of the formula (7).

$$dr = irec^* / \hat{idc} \qquad (8)$$

That is to say, in order to make the virtual DC link voltage Vdc follow the command value Vdc*, the rectifying duty dr comes to be set to a ratio (irec*/$\hat{idc}$) of the command value irec* to the estimated value $\hat{idc}$.

The following formula (9) has to hold in consideration of the formula (2) in order to make the virtual DC link voltage Vdc follow the command value Vdc*.

$$Vdc^* = dr \cdot Vrec + dc \cdot Vc \qquad (9)$$

There, the rectifying duty dr is set to a value set by the formula (8), and the capacitor voltage Vc is actually fixed. Therefore, parameters that can be selected for making a right side of the formula (9) equal to the given command value Vdc* are the zero voltage duty dz and the discharge duty dc.

The discharge duty dc is determined according to the following formula (10) directly led from the formula (9).

$$dc = (Vdc^* - dr \cdot Vrec)/Vc \qquad (10)$$

It is noted that the capacitor voltage Vc technically comes to reduce at the period during which the formula (7) holds ("discharge zone"). This is because the command value ib* is set to 0 as described above. However, appropriate setting of the command value irec* enables the discharge zone to be shorten to an extent where the reduction in the capacitor voltage Vc can be ignored.

In Japanese Patent Application Laid-Open No. 2011-193678, Japanese Patent Application Laid-Open No. 2012-135184 and Ohnuma, Itoh: "Experimental Verification of Single Phase to Three Phase Converter Using an Active Buffer circuit with a Charge Circuit", IEEJ 2010 Industry Applications Society Conference 1-124, pp. 1-587-590 (2010), since the rectified current irec has a waveform of full-wave rectification, such selection of the command value irec* was not considered. However, in this embodiment, since the rectified current irec is not limited to the waveform of the full-wave rectification, the discharge zone is shortened and the discharge duty dc can be set with the formula (10) wherein the capacitor voltage Vc is constant.

Additionally, since a restricting condition of the formula (1) is present, the zero voltage duty dz comes to be obtained by the following formula (11).

$$dz = 1 - dr - dc \qquad (11)$$

As is seen above, at the discharge zone, when the command value irec* and the estimated value $\hat{idc}$ are obtained, the rectifying duty dr is determined according to the formula (8). Further, the discharge duty dc and the zero voltage duty dz are uniquely determined according to the formulas (10) and (11), respectively.

That is to say, since the zero voltage duty dz is not allowed to take a value not less than the value determined according to the formula (11), it is set to a minimum value thereof. That is to say, it can be grasped that the discharge duty dc for making the zero voltage duty dz minimum is set also in the discharge zone, similarly to the charge zone and the charge/discharge zone.

When the rectifying duty dr, the zero voltage duty dz, the discharge duty dc, and the command value ib* are determined in the above manner, the control signals Sb, Sc, and Sg can be generated by using a publicly-known technique.

Figure 4:
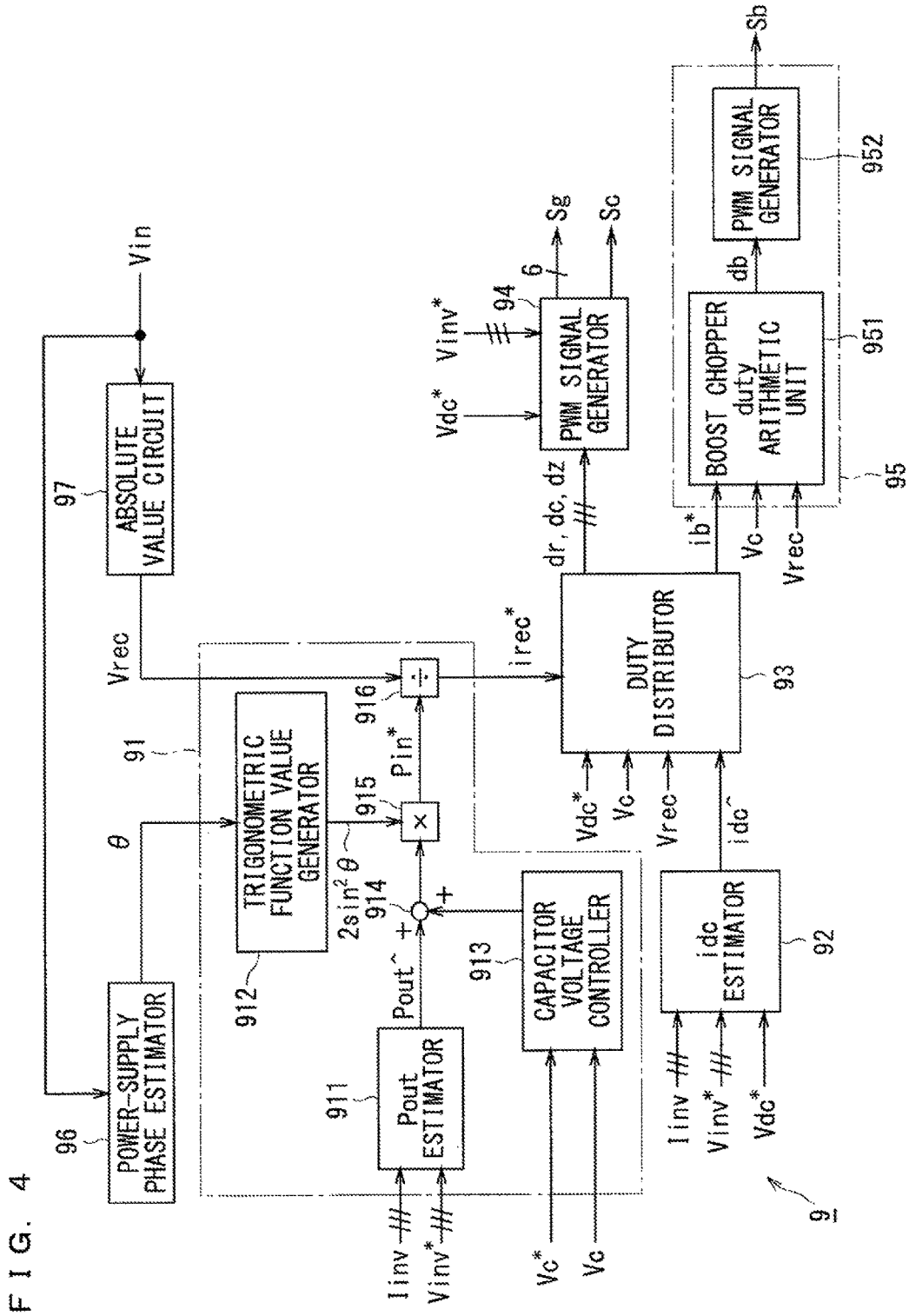
FIG. 4 is a block diagram illustrating a configuration of a controller of direct AC power converter according to the embodiment.

FIG. 4 is a block diagram illustrating a configuration of the controller 9. The controller 9 is roughly divided into a current command generator 91, a DC current estimator 92, a duty divider 93, a pulse width modulation signal generator 94, and a chopper signal generator 95.

The current command generator 91 generates the command value irec* of the rectified current irec. As detailed later, FIG. 4 illustrates a configuration where the command value irec* has an absolute value of a sinusoidal wave form, but the command value irec* is not always limited to provision of such a waveform.

The DC current estimator 92 obtains the estimated value $\hat{idc}$ of the DC current idc. As is understood from the equivalent circuit of FIG. 3, a portion that can actually measure the DC current idc is not present in an actual circuit. Therefore, the estimated value $\hat{idc}$ is adopted in the calculation expressed by the formulas (6) and (8).

The DC current idc and the virtual DC link voltage Vdc enables obtaining of an electric power to be output from the inverter 6 in the equivalent circuit. On the other hand, an electric power to be output from the inverter 6 in the actual circuit is obtained by the three-phase electric current Iinv and a three-phase voltage Vinv to be output from the inverter 6. Therefore, theoretically the estimated value $\hat{idc}$ can be obtained from the virtual DC link voltage Vdc, the electric current Iinv, and a voltage Vinv.

It is noted that the voltage Vinv to be output from the inverter 6 is controlled by the pulse width modulation signal generator 94 so as to follow its command value Vinv*. Further, the virtual DC link voltage Vdc itself cannot be measured, but is controlled by the duty divider 93 so as to follow the command value Vdc*. On the other hand, the electric current Iinv can be measured from wire connection between the inverter 6 and the permanent-magnet synchronous motor PMSM. In this embodiment, therefore, the estimated value idc^ is obtained from the command values Vdc* and Vinv*, and the electric current Iinv. Naturally, the estimated value idc^ may be obtained by another method.

The duty divider 93 determines the rectifying duty dr, the zero voltage duty dz, the discharge duty dc, and the command value ib* according to the methods described in the first to third cases based on the command values Vdc* and irec*, the capacitor voltage Vc, the rectified voltage Vrec, and the estimated value idc^. The expression "duty 'divider'" is given here because as expressed by the formula (2), the value 1 is divided by the rectifying duty dr, the zero voltage duty dz, and the discharge duty dc.

The pulse width modulation signal generator 94 generates the control signals Sc and Sg based on the rectifying duty dr, the zero voltage duty dz, the discharge duty dc, and the command value Vinv* and Vdc*. For example, these duties and respective phase parts of the command value Vinv* are operated so that signal waves are generated, and the signal waves and a triangular wave carrier are compared with each other so that the control signals Sc and Sg can be generated. Since such a method is publicly known, and is described in, for example, Japanese Patent Application Laid-Open No. 2011-193678 and Japanese Patent Application Laid-Open No. 2012-135184, detailed description thereof is omitted.

The chopper signal generator 95 has a boost chopper duty arithmetic unit 951 and a pulse width modulation signal generator 952. The boost chopper duty arithmetic unit 951 determines the boost duty db based on the command value ib*, the capacitor voltage Vc, and the rectified voltage Vrec.

A method for determining the boost duty db varies depending on a mode that operates the boost chopper 3. As this method, however, a normal method for determining the discharge duty of the boost chopper can be adopted, and thus detailed description thereof is omitted.

The pulse width modulation signal generator 952 can also generate the control signal Sb based on the boost duty db according to a publicly-known modulation method.

A configuration of the current command generator 91 is described below. The current command generator 91 has an output power estimator 911, a trigonometric function value generator 912, a capacitor voltage controller 913, an adder 914, a multiplier 915, and a divider 916.

The output power estimator 911 obtains an estimated value Pout^ of an output power Pout based on the command value Vinv* and the electric current Iinv. Since the DC current estimator 92 obtains the estimated value idc^ in the above manner, the DC current estimator 92 may receive the estimated value Pout^ obtained from the output power estimator 911 and the command value Vdc* so as to obtain the estimated value idc^.

The capacitor voltage controller 913 obtains a deviation Vc*−Vc, which is output to the adder 914 after being provided with at least proportional control, between the capacitor voltage Vc and its command value Vc*.

The adder 914 adds an output from the capacitor voltage controller 913 to the estimated value Pout^. This is a process for suitably setting a command value Pin* of the input power by correcting the estimated value Pout^ so as to be larger/smaller when the capacitor voltage Vc becomes smaller/larger than the command value Vc* respectively, so as to reduce the deviation. As the capacitor voltage controller 913, not merely proportional control as it is but proportional-integral control, or proportional-integral-derivative control is desirably adopted for stability of the deviation.

Here is assumed the case where the command value irec* of the rectified current irec takes an absolute value of the sinusoidal waveform, and the rectified voltage Vrec takes the absolute value of the sinusoidal waveform, thus an output from the adder 914 is multiplied by a trigonometric function value $2\cdot\sin^2\theta$ so that the command value Pin* is obtained.

The trigonometric function value generator 912 generates the trigonometric function value $2\cdot\sin^2\theta$ based on a phase angle $\theta$ of the power-supply voltage. The multiplier 915 multiplies an added result of the adder 914 and trigonometric function value $2\cdot\sin^2\theta$ so as to obtain the command value Pin*.

Since an input power Pin is a product of the rectified voltage Vrec and the rectified current irec, the command value irec* of the rectified current irec is obtained by dividing the command value Pin* by the rectified voltage Vrec.

The phase angle $\theta$ is estimated from, for example, the measured voltage Vin by a power-supply phase estimator 96. The power-supply phase estimator 96 can be constituted by, for example, a phase locked loop. The rectified voltage Vrec can be obtained in, for example such a manner that an absolute value circuit 97 obtains an absolute value of the measured voltage Vin. Since concrete configurations of the power-supply phase estimator 96 and the absolute value circuit 97 are publicly-known techniques, details thereof are not described.

Figure 5:
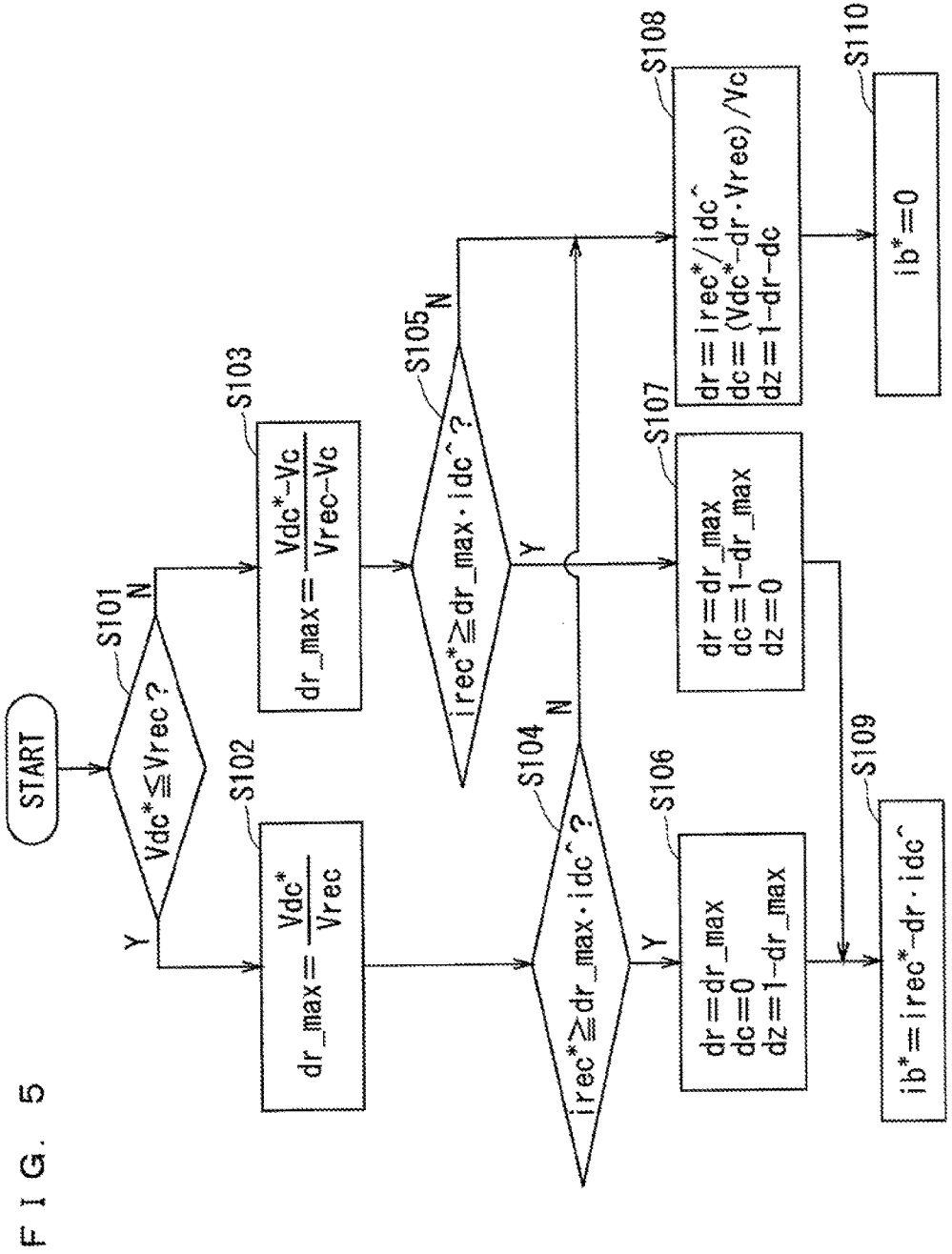
FIG. 5 is a flowchart organizing steps of obtaining a rectifying duty, a zero voltage duty, a discharge duty, and a current command value.

FIG. 5 is a flowchart organizing steps of obtaining the rectifying duty dr, the zero voltage duty dz, the discharge duty dc, and the command value ib*. It is grasped that this flowchart shows an operation of the duty divider 93.

Step S101 corresponds to a determination whether the operation of the direct AC power converter corresponds to the first case or the second case if it does not correspond to the third case. The determination is made at step S101 whether the command value Vdc* of the virtual DC link voltage Vdc is the rectified voltage Vrec or less. The process goes to steps S102 and S104 when the determination is affirmative, steps S103 and S105 when negative, respectively.

Steps S102 and S104 are processes for determining whether the operation of the direct AC power converter corresponds to the first case or the third case. In consideration of the formula (4), dr_max=Vdc*/Vrec is obtained at step S102. A determination is made at step S104 whether or not the command value irec* is a value dr_max·idc^ or more in consideration of the formula (7). When the determination at step S104 is affirmative, the operation of the direct AC power converter corresponds to the first case, and the process goes to steps S106 and S109. When the determination at step S104 is negative, the operation of the direct AC power converter corresponds to the third case, and the process goes to steps S108 and S110.

Steps S103 and S105 are processes for determining whether the operation of the direct AC power converter corresponds to the second case or the third case. In consideration of the formula (5), dr_max=(Vdc*−Vc)/(Vrec−Vc) is obtained at step S103. A determination is made at step S105 whether or not the command value irec* is the value dr_max·idc^ or more in consideration of the formula (7) similarly to step S104. When the determination at step S105 is affirmative, the operation of the direct AC power converter corresponds to the second case, and the process goes to steps S107 and S109. When the determination at step S105 is negative, the operation of the direct AC power converter corresponds to the third case, and the process goes to steps S108 and S110.

Steps S106, S107 and S108 are setting each duty according to the first case, the second case, and the third case, respectively. The step S109 is setting of the command value ib* according to the first case and the second case, and step S110 is setting of the command value ib* according to the third case. These setting contents are as described above.

When Vdc>Vrec, any of steps S107 and S108 is executed according to the determined result at step S101. When step S107 is executed, the discharge duty dc takes a value (1−dr). In this case, the rectifying duty dr is expressed by the formula (5), and is smaller than 1. In this case, therefore, the discharge duty dc is larger than 0.

Or, when step S108 is executed, the discharge duty dc takes a value expressed by the formula (10). When Vdc>Vrec, a numerator of a right side of the formula (10) is larger than 0 regardless of the value of the rectifying duty dr. Also in this case, therefore, the discharge duty dc is larger than 0.

That is to say, when Vdc>Vrec, the setting is always such that dc>0.

The controller 9 can be realized by including, for example, a microcomputer and a storage device. The microcomputer executes the respective processing steps (in other words, the procedure) described in a program. The storage device can be configured by, for example, one of or a plurality of various storage devices such as a ROM (Read Only Memory), a RAM (Random Access Memory), rewritable non-volatile memory (such as an Erasable Programmable ROM (EPROM)), and a hard disc device. The storage device stores various information and data etc., and stores a program to be executed by the microcomputer, and provides a work area for executing the program. It is noted that the microcomputer can be grasped to function as various means corresponding to the respective processing steps described in the program, or can be grasped to realize various functions corresponding to the respective processing steps. Further, the controller 9 is not limited to this, and thus some of or entire of various procedures (obtaining respective measured values, executing steps S101 to S110 etc.) to be executed by the controller 9, or respective elements composing those, or various functions may be realized by hardware.

Examples

Examples expressing the effects of the use of the above methods are described below.

In the above Japanese Patent Application Laid-Open No. 2011-193678, Japanese Patent Application Laid-Open No. 2012-135184 and Ohnuma, Itoh: "Experimental Verification of Single Phase to Three Phase Converter Using an Active Buffer circuit with a Charge Circuit", IEEJ 2010 Industry Applications Society Conference 1-124, pp. 1-587-590 (2010), the following conditions are satisfied:

(i) the period during which the electric current ib flows is excluded from the providing period during which an electric power is provided from the capacitor 34 to the DC link 7; and (ii) the receiving period during which the capacitor 34 receives the electric power from the DC link 7 and the providing period are set alternately in each ¼ of the cycle of the AC voltage Vin.

When the rectified current irec is allowed to be distorted from a sinusoidal waveform with the conditions (i) and (ii) being satisfied, a peak current of the electric current ib can be reduced to be lower than the peak current in a case where it is not allowed. This is because a change in the electric current ib at the receiving period should be reduced.

Figure 6:
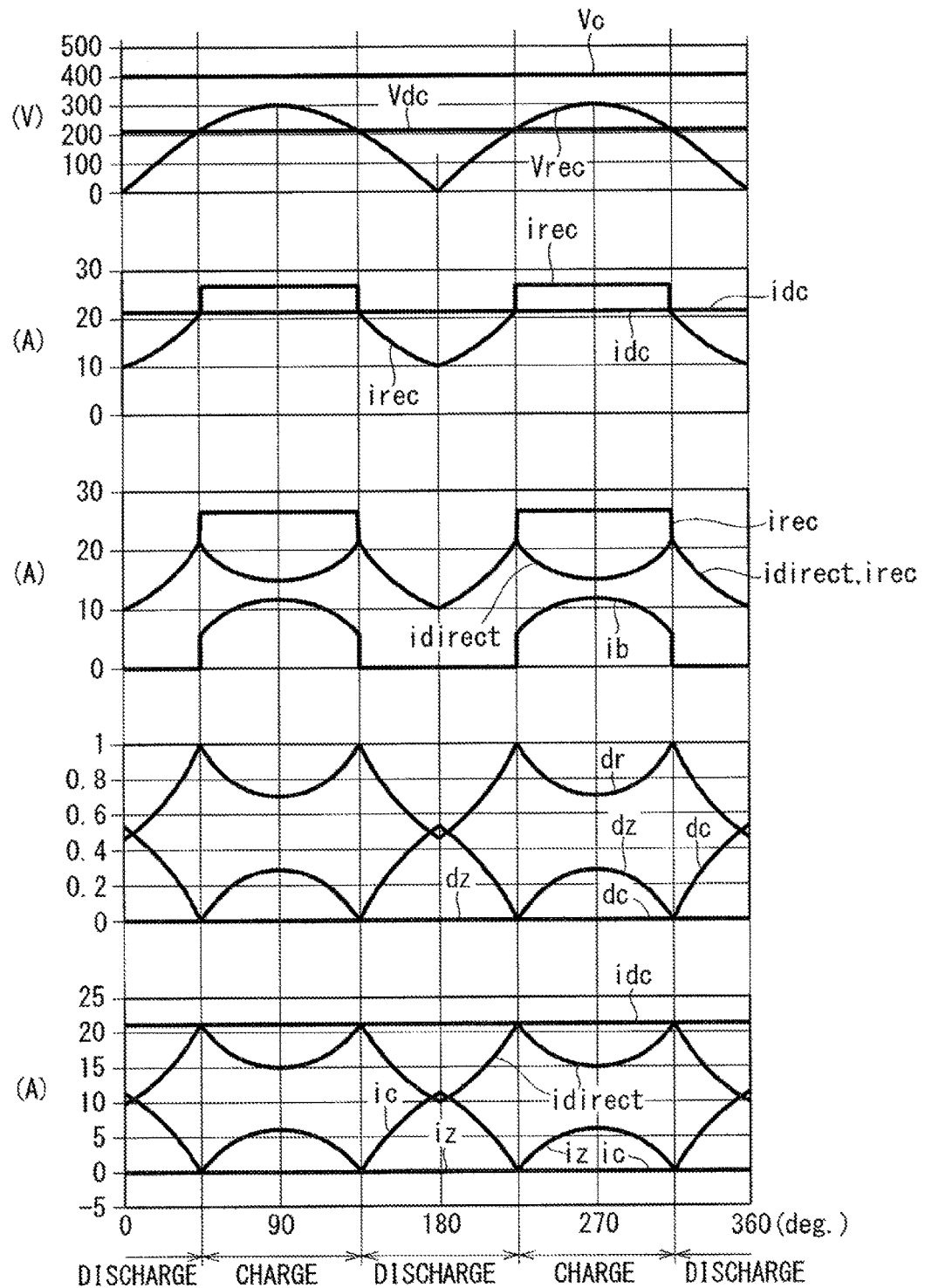
FIG. 6 is a graph showing waveforms of specifications of a comparative example 1.
Figure 7:
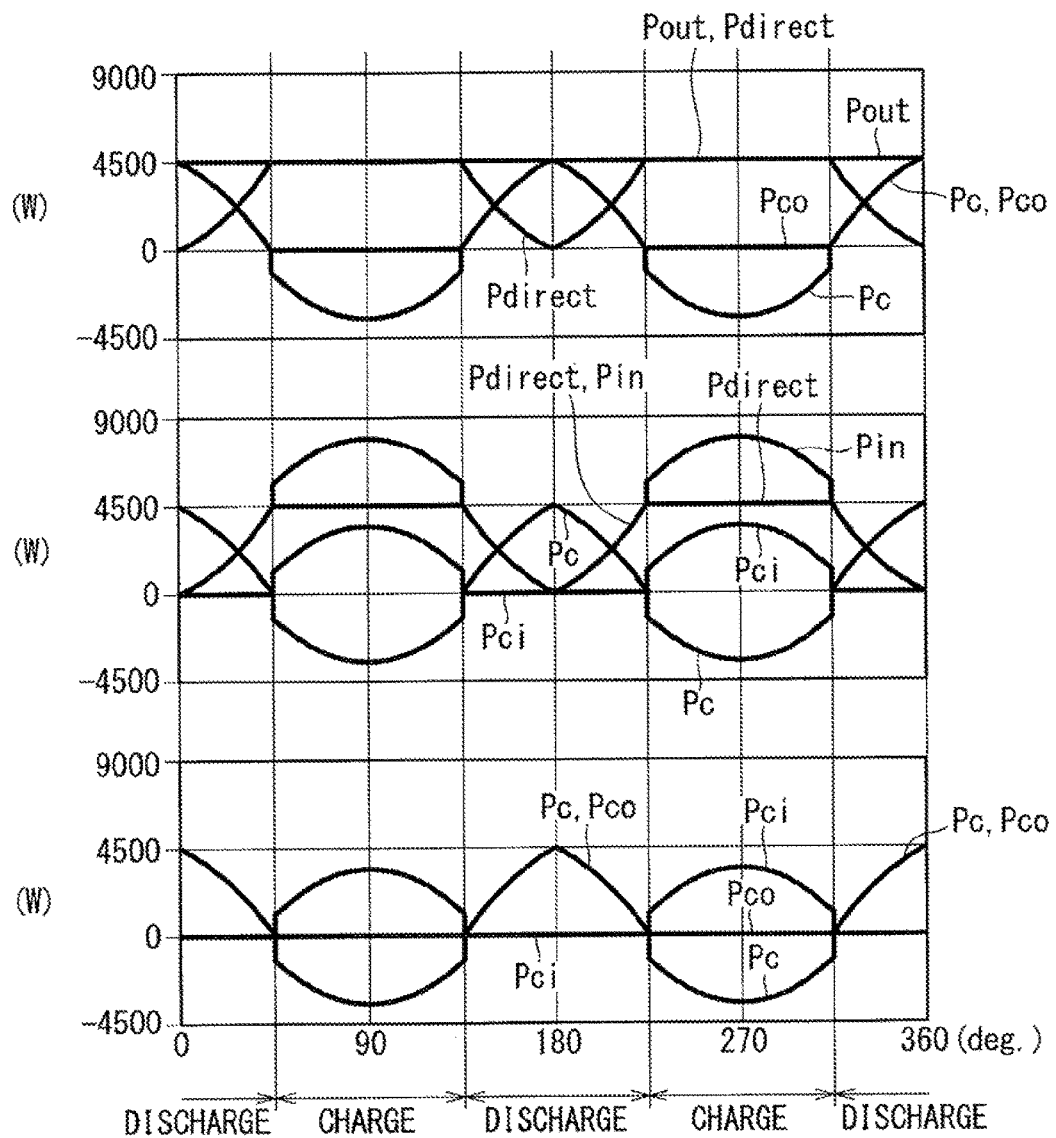
FIG. 7 is a graph showing waveforms of specifications of the comparative example 1.

FIG. 6 and FIG. 7 are graphs showing waveforms of specifications in a case where the peak current of the electric current ib is reduced while the above conditions (i) and (ii) are maintained by simulation ("comparative example 1"). It is noted that the virtual DC link voltage Vdc is set to 1/√2 (212 V) of a crest value (300 V) of the rectified voltage Vrec. Further, the capacitor voltage Vc is higher than the rectified voltage Vrec and is constant (400 V) (the same shall apply hereafter).

Further, in order to ensure consistency with respect to the embodiment, the providing period and the receiving period are not adopted but "charge" and "discharge" are described on a horizontal axis. Here, "discharge" means the period during which the capacitor 34 can be charged, and "discharge" means the period during which the capacitor 34 can be discharged. Further, the electric current ib does not flow at the "discharge" period according to the above condition (i). Further, "charge" and "discharge" are ¼ (90° of the cycle of the AC voltage Vin according to the condition (ii).

A first row in FIG. 6 shows waveforms of the capacitor voltage Vc, the rectified voltage Vrec, and the virtual DC link voltage Vdc (this is assumed to accurately follow the command value Vdc*. The same shall apply hereafter).

A second row in FIG. 6 shows waveforms of the rectified current irec (this is assumed to accurately follow the command value irec*. The same shall apply hereafter), and the DC current idc (this is assumed to be accurately estimated by the estimated value idc^. The same shall apply hereafter). When the DC current idc is made to be constant, in cooperation with the virtual DC link voltage Vdc that takes a constant value, the output power Pout becomes constant.

A third row in FIG. 6 shows waveforms of the rectified current irec, the electric current idirect (this is obtained by a product of the rectifying duty dr and the estimated value idc^. The same shall apply hereafter), and the electric current ib (this is assumed to accurately follow the command value ib*. The same shall apply hereafter).

A fourth row in FIG. 6 shows waveforms of the rectifying duty dr, the discharge duty dc, and the zero voltage duty dz.

A fifth row in FIG. 6 shows waveforms of the DC current idc, the electric current idirect, an electric current is to flow from the capacitor 34 to the DC link 7 (this is obtained by a product of the discharge duty dc and the estimated value idc^. The same shall apply hereafter), a zero-phase current iz (this is obtained by a product of the zero voltage duty dz and the estimated value idc^. The same shall apply hereafter).

A first row in FIG. 7 shows waveforms of an electric power Pout to be output from the inverter 6 (this is assumed to be accurately estimated based on the estimated value Pout^. The same shall apply hereafter), an electric power Pdirect to be determined based on the rectified voltage Vrec and the electric current idirect, an electric power Pco to be discharged from the capacitor 34, and an electric power Pc to be input/output into/from the capacitor 34. The electric power Pc takes a negative value because it reduces the electric power Pout is reduced at a charge time, and it matches with the electric power Pco at a discharge time.

A second row in FIG. 7 shows waveforms of the input power Pin (this is assumed to accurately follow the command value Pin*. The same shall apply hereafter), the electric power Pdirect, an electric power Pci with which the capacitor 34 is charged, and the electric power Pc. The electric power Pc has the same absolute value as that of the electric power Pci at the charge time.

A third row in FIG. 7 shows a graph where the electric powers Pc, Pci, and Pco relating to the capacitor 34 are extracted from the first and second rows in FIG. 7 so as to be brought together.

When a peak of the electric current ib is reduced as that, its peak value is 44% (11.6 A) of the crest value of the electric current to flow from the single-phase AC power supply (input current). In order to reduce a change in the electric current ib, the rectified current irec is planarized at the "charge" period, and is considerably distorted from the sinusoidal waveform.

Further, a power current abruptly changes, thus it may be said that the waveform is not practically preferable from a viewpoint of a power-supply noise and resonance of a filter circuit. When the abrupt change in the power current is suppressed, namely, when the rectified current irec, which changes continuously and whose value becomes 0 when a power voltage crosses zero, is made to flow, the peak value of the electric current ib becomes larger.

On the contrary, when the virtual DC link voltage Vdc is larger than the rectified voltage Vrec, not only the discharge but also the charge are performed on the capacitor 34, so that the peak current of the electric current ib is further suppressed by using the method according to this embodiment.

Figure 8:
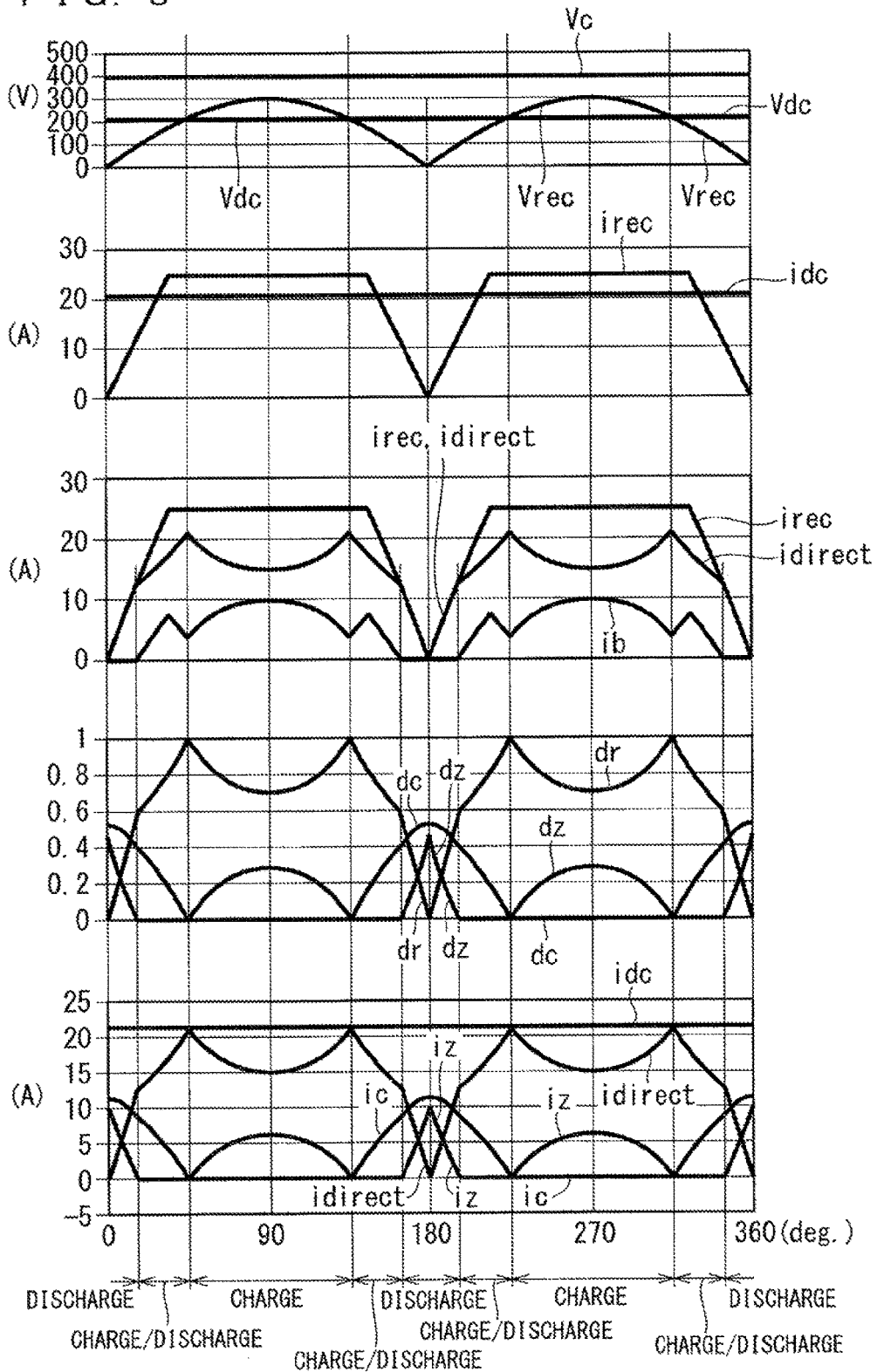
FIG. 8 is a graph showing waveforms of specifications of an example 1.
Figure 9:
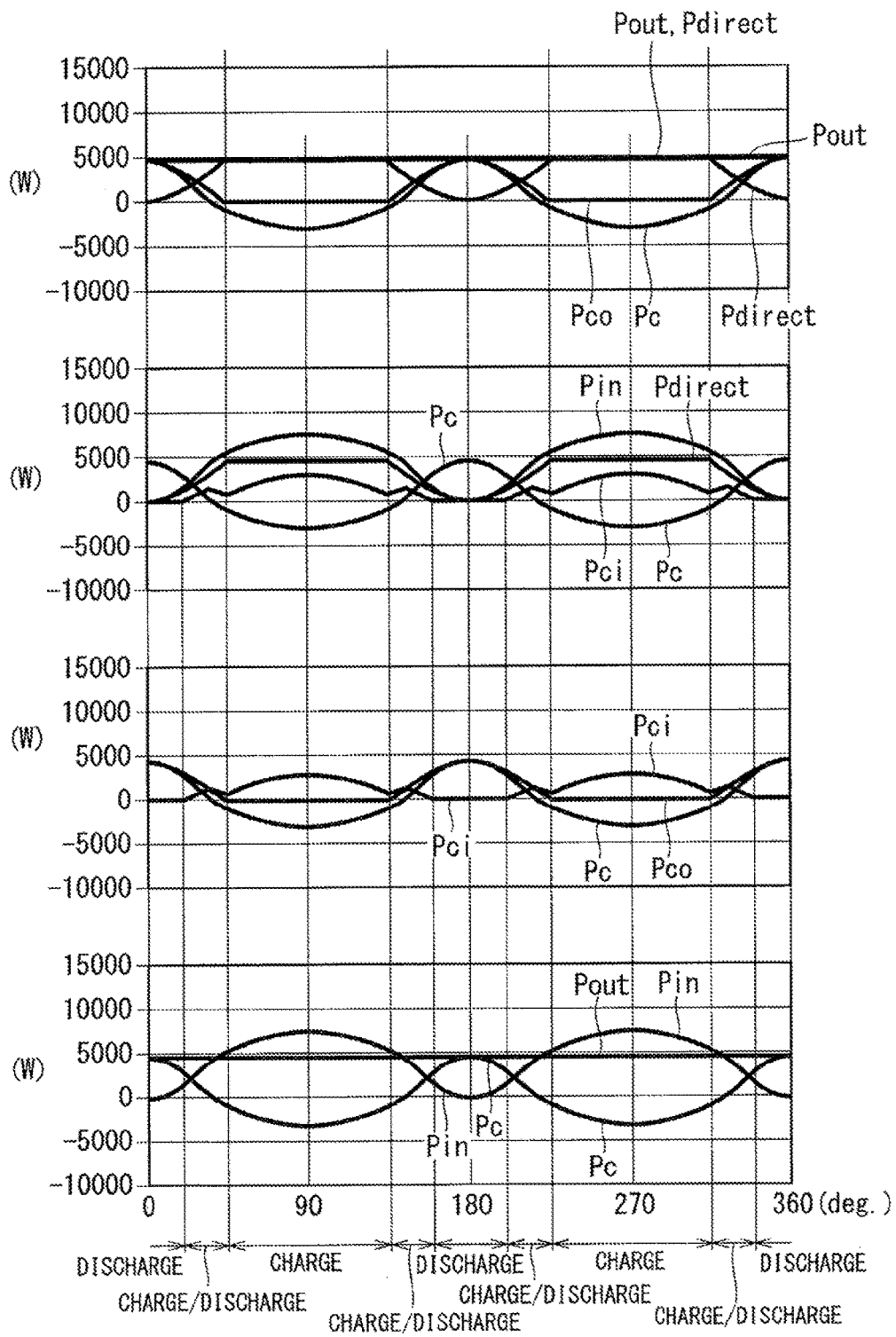
FIG. 9 is a graph showing waveforms of specifications of the example 1.

FIG. 8 and FIG. 9 are graphs showing waveforms of specifications in a case where control is made by simulation according to the method of this embodiment ("example 1"). FIG. 8 and FIG. 9 show waveforms of the specifications corresponding to FIG. 6 and FIG. 7 respectively. It is noted that the virtual DC link voltage Vdc and the electric current idc are equal to those described with FIG. 6 and FIG. 7, and are set to 212 V and 21.2 A, respectively. Further, the crest value of the rectified voltage Vrec is also set to 300 V.

The charge is performed but the discharge is not performed on the capacitor 34 at the "charge" period in the graphs of FIG. 8 and FIG. 9 (Pci>0, Pco=0). Concretely, the "charge" period is a period during which the virtual DC link voltage Vdc is the rectified voltage Vrec or less, is =0 (namely, dc=0), and steps S106 and S109 in FIG. 5 are executed. Further, the discharge is performed but the charge is not performed on the capacitor 34 at the "discharge" period (Pco>0, Pci=0). Concretely, the "discharge" period is a period during which the virtual DC link voltage Vdc is larger than the rectified voltage Vrec, iz>0 (namely, dz>0), and steps S108 and S110 in FIG. 5 are executed. And, the "charge/discharge" period is a period during which the virtual DC link voltage Vdc is larger than the rectified voltage Vrec, iz=0 (namely, dz=0), and steps S107 and S109 in FIG. 5 are executed. The "charge/discharge" period includes a period during which the electric power Pci for charging the capacitor 34 is larger than the electric power Pco to be discharged from the capacitor 34 (namely, the period during which Pc<0: this is adjacent to the "charge" period, and is separated from the "discharge" period), and a period during which the electric power Pco to be discharged from the capacitor 34 is larger than the electric power Pci for charging the capacitor 34 (namely, the period during which Pc>0: this is adjacent to the "discharge" period and is separated from the "charge" period).

When the peak of the electric current ib is reduced, the peak value is 40% (10.0 A) of the crest value of the electric current to flow from the single-phase AC power supply.

In the example 1, the provision of the "charge/discharge" period enables the peak of the electric current ib to be reduced so as to be lower than that in the comparative example 1.

Even in the case shown in FIG. 8 and FIG. 9, however, since the virtual DC link voltage Vdc is $1/\sqrt{2}$ of the crest value of the rectified voltage Vrec, the "charge" periods match with those in the case shown in FIG. 6 and FIG. 7. Therefore, the limitation of the condition (i) is eliminated so that the virtual DC link voltage Vdc can be set so as to be higher than $1/\sqrt{2}$ of the crest value of the rectified voltage Vrec.

Figure 10:
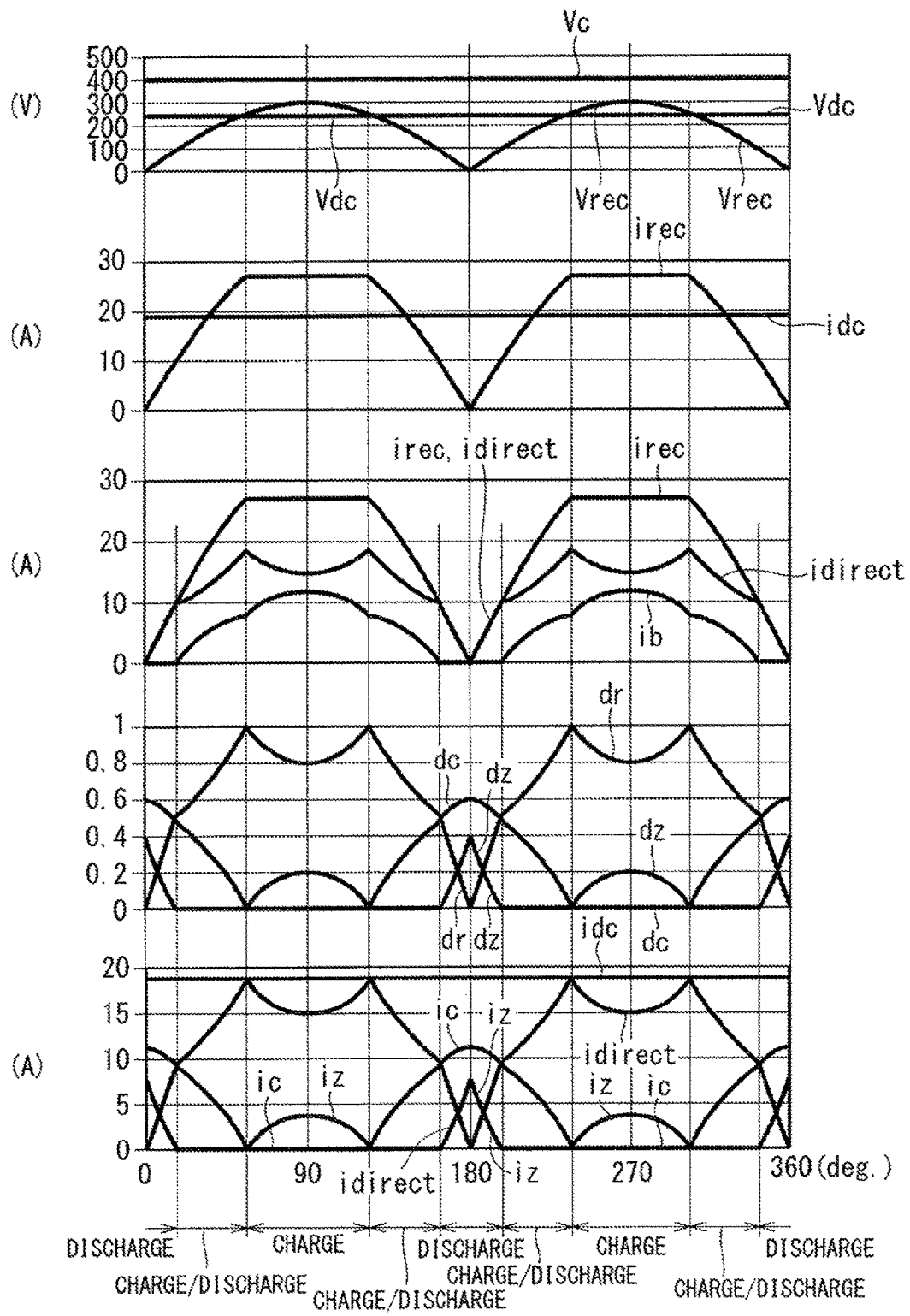
FIG. 10 is a graph showing waveforms of specifications of an example 2.
Figure 11:
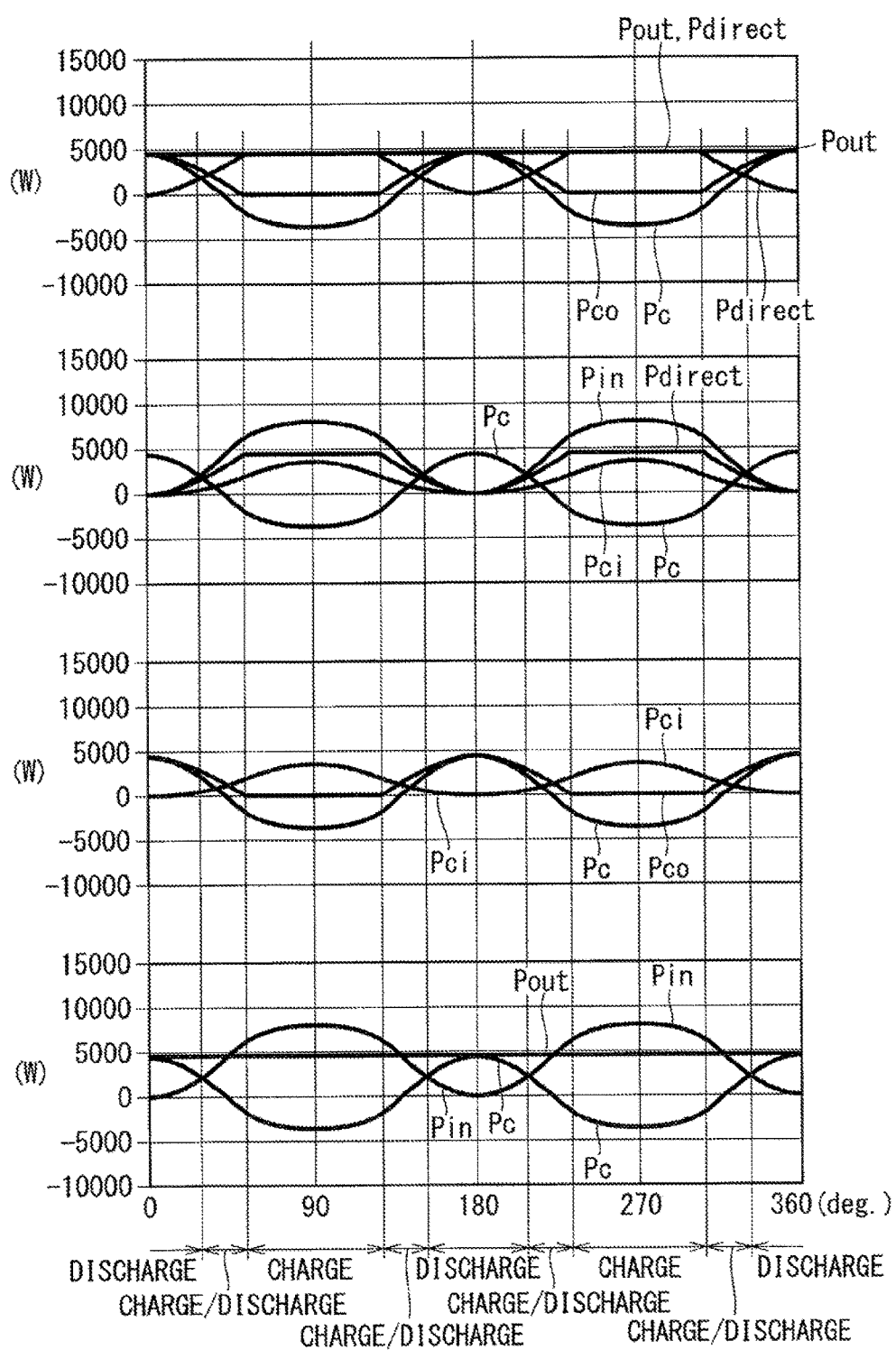
FIG. 11 is a graph showing waveforms of specifications of the example 2.

FIG. 10 and FIG. 11 are graphs showing waveforms of specifications in a case where the control is made by simulation according to the method in this embodiment ("example 2"). Waveforms of the specifications corresponding to FIG. 8 and FIG. 9 are respectively shown. It is noted that a case is shown where the crest value of the rectified voltage Vrec is set to 300 V similarly to FIG. 6 to FIG. 9, but the virtual DC link voltage Vdc is set to 0.8 (240 V) times the crest value of the rectified voltage Vrec.

By setting the "charge" period shorter and the "charge/discharge" period longer, a ratio of the virtual DC link voltage Vdc to the crest value of the rectified voltage Vrec is heightened. The "charge" period correspond to steps S106 and S109 in FIG. 5, the "discharge" period corresponds to steps S108 and S110 in FIG. 5, and the "charge/discharge" period corresponds to steps S107 and S109 in FIG. 5. In this case, the crest value of the input current is 27.0 A, and the electric current ib is 12.0 A.

Figure 12:
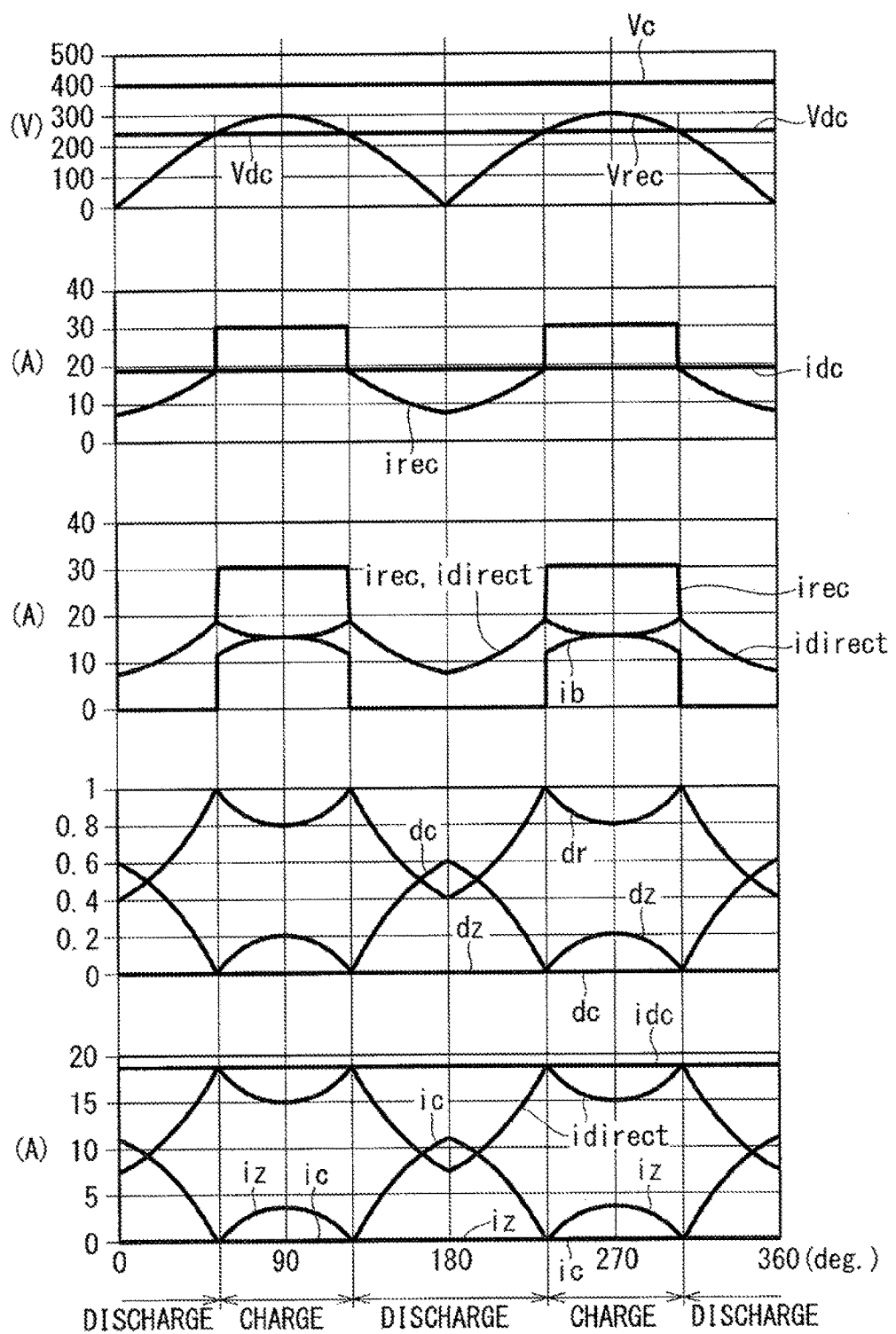
FIG. 12 is a graph showing waveforms of specifications of a comparative example 2.

Even when the limitation of the condition (i) is not removed but only a limitation of the condition (ii) is removed, the ratio of the virtual DC link voltage Vdc to the crest value of the rectified voltage Vrec can be heightened. FIG. 12 and FIG. 13 are graphs showing waveforms of specifications in a case where the peak current of the electric current ib is reduced by simulation without providing the "charge/discharge" period ("comparative example 2"). Waveforms of specifications corresponding to FIG. 6 and FIG. 7 are respectively shown. It is noted that the crest value of the rectified voltage Vrec is set to 300 V similarly to FIG. 10 and FIG. 11, and the virtual DC link voltage Vdc is set to 0.8 (240 V) times the crest value of the rectified voltage Vrec.

By setting the "charge" period shorter and the "discharge" period longer, the ratio of the virtual DC link voltage Vdc to the crest value of the rectified voltage Vrec is heightened. However, when the period during which the electric current ib flows is limited to the "charge" period, the peak value of the electric current ib naturally rises. The peak value of the electric current ib, here, comes to 15.3 A, and the crest value of the input current comes to 30.3 A. These values are all larger than the values in the case described in the example 2. Naturally, in the comparative example 2, the rectified current irec is fairly distorted from the absolute value of the sinusoidal wave.

On the contrary, with the method in this embodiment, even when the virtual DC link voltage Vdc is made to be larger than $1/\sqrt{2}$ times the crest value of the rectified voltage Vrec, the rectified current irec can show the sinusoidal waveform.

Figure 14:
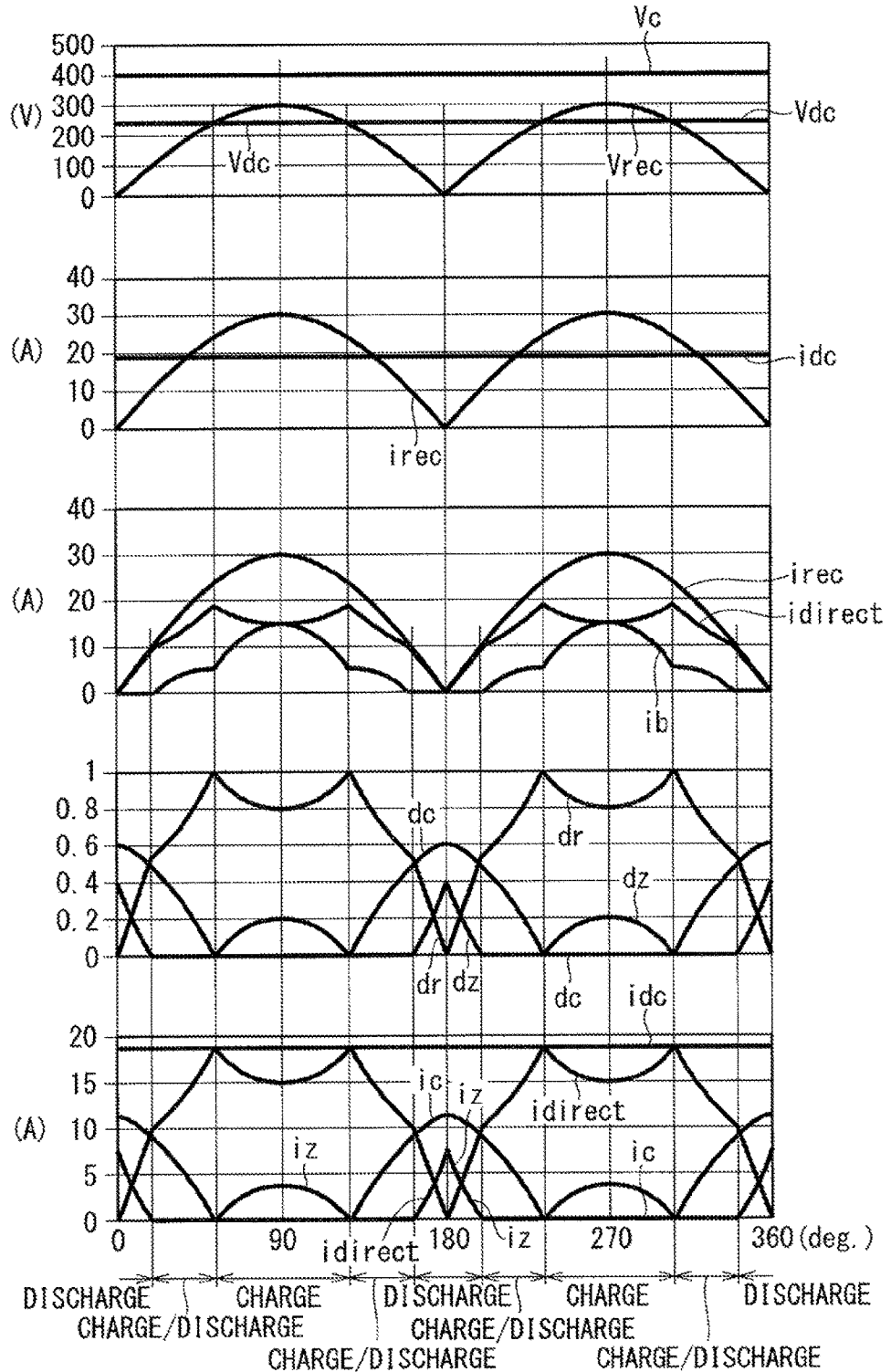
FIG. 14 is a graph showing waveforms of specifications of an example 3.
Figure 15:
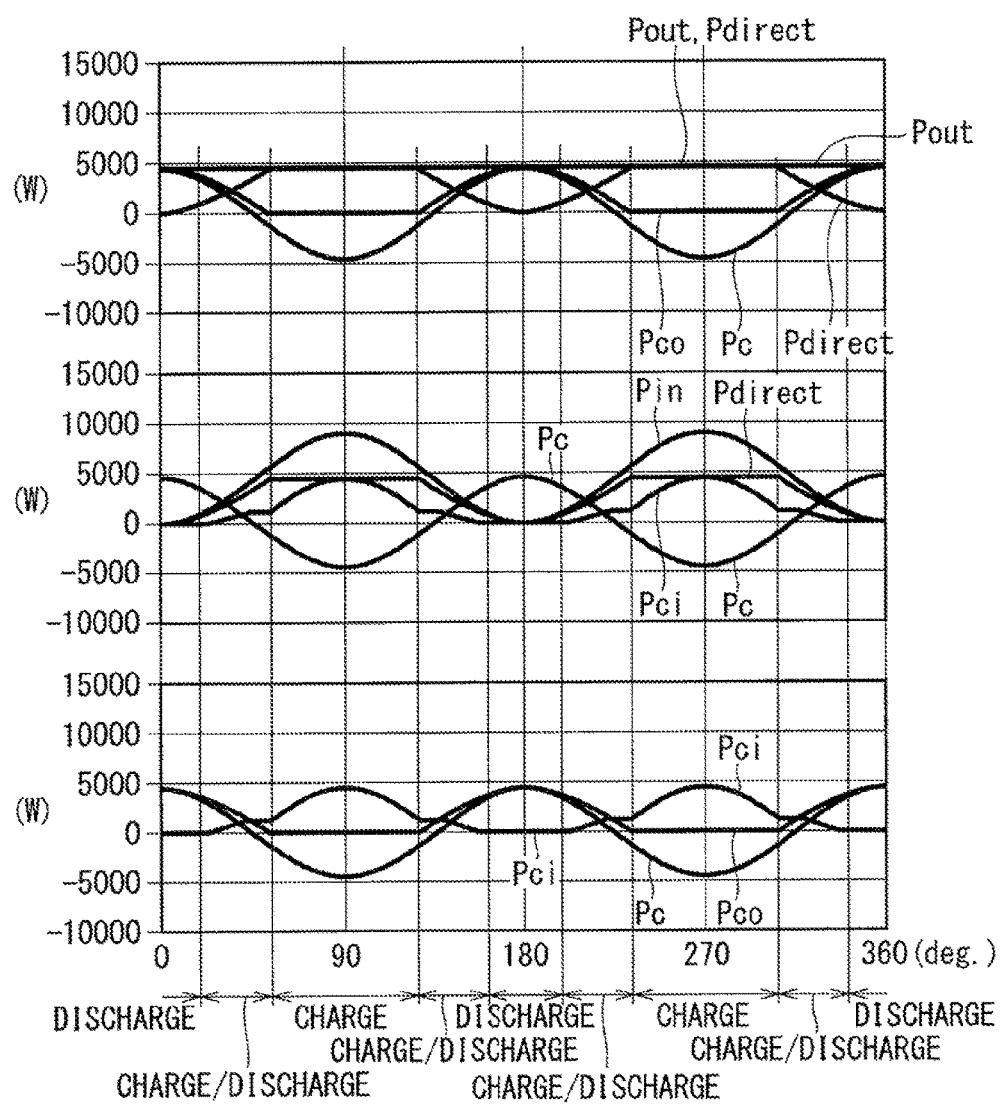
FIG. 15 is a graph showing waveforms of specifications of the example 3.

FIG. 14 and FIG. 15 are graphs showing waveforms of specifications in a case where the control is made by simulation according to the method in this embodiment ("example 3"). Waveforms of specifications corresponding to FIG. 10 and FIG. 11 are respectively shown. It is noted that a case is shown where the crest value of the rectified voltage Vrec is set to 300 V similarly to FIG. 10 and FIG. 11, the virtual DC link voltage Vdc is set to 0.8 (240 V) times the crest value of the rectified voltage Vrec, and further the waveform of the rectified current irec is the absolute value of the sinusoidal wave.

The peak value of the electric current ib comes to 15.0 A and is still smaller than the comparative example 2. Furthermore, since the waveform of the rectified current irec is the absolute value of the sinusoidal wave, generation of so-called power line harmonics is suppressed. Such an effect of the example 3 cannot be realized as long as the condition (i) is maintained even if the condition (ii) is removed.

Figure 16:
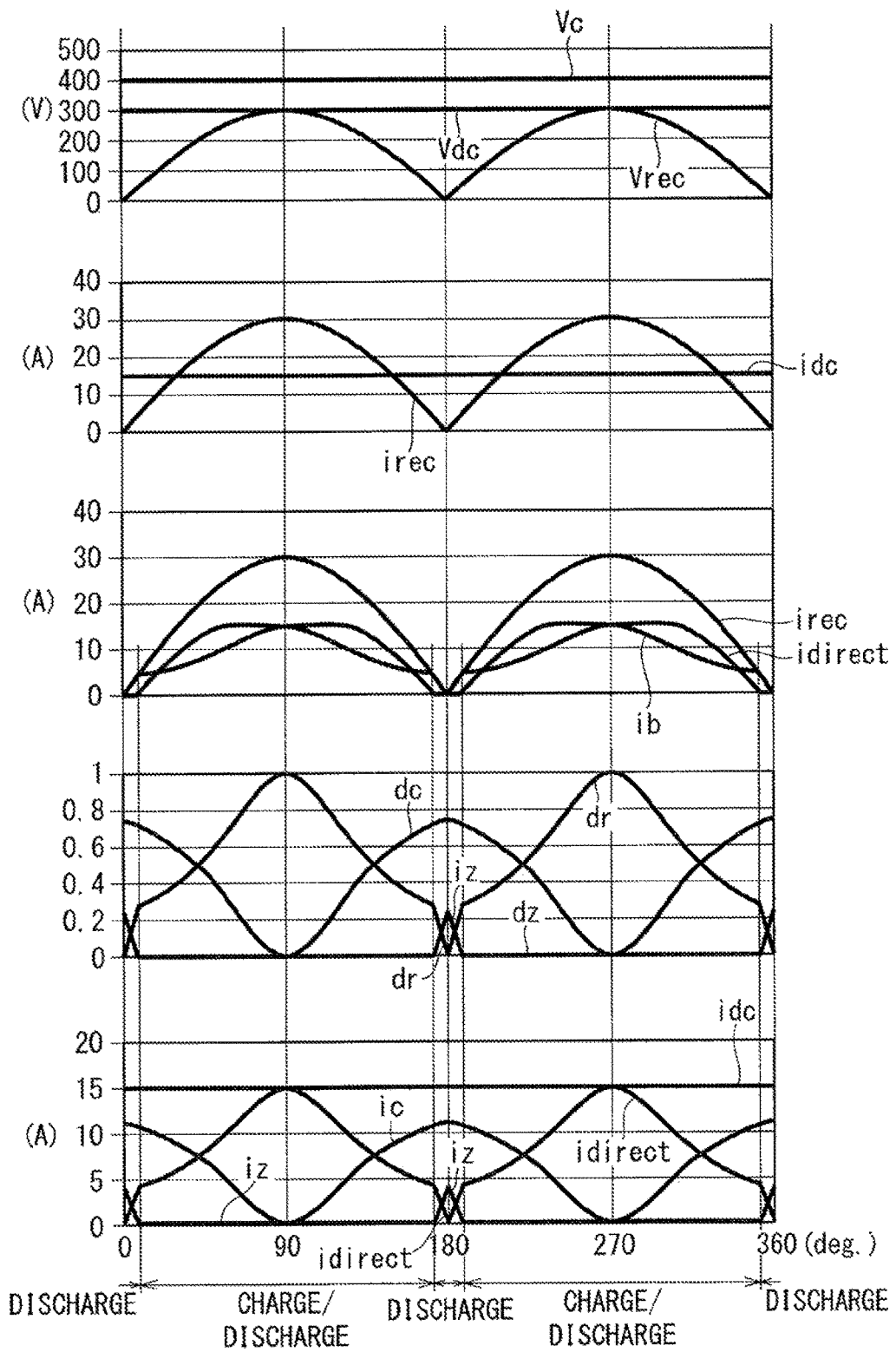
FIG. 16 is a graph showing waveforms of specifications of an example 4.
Figure 17:
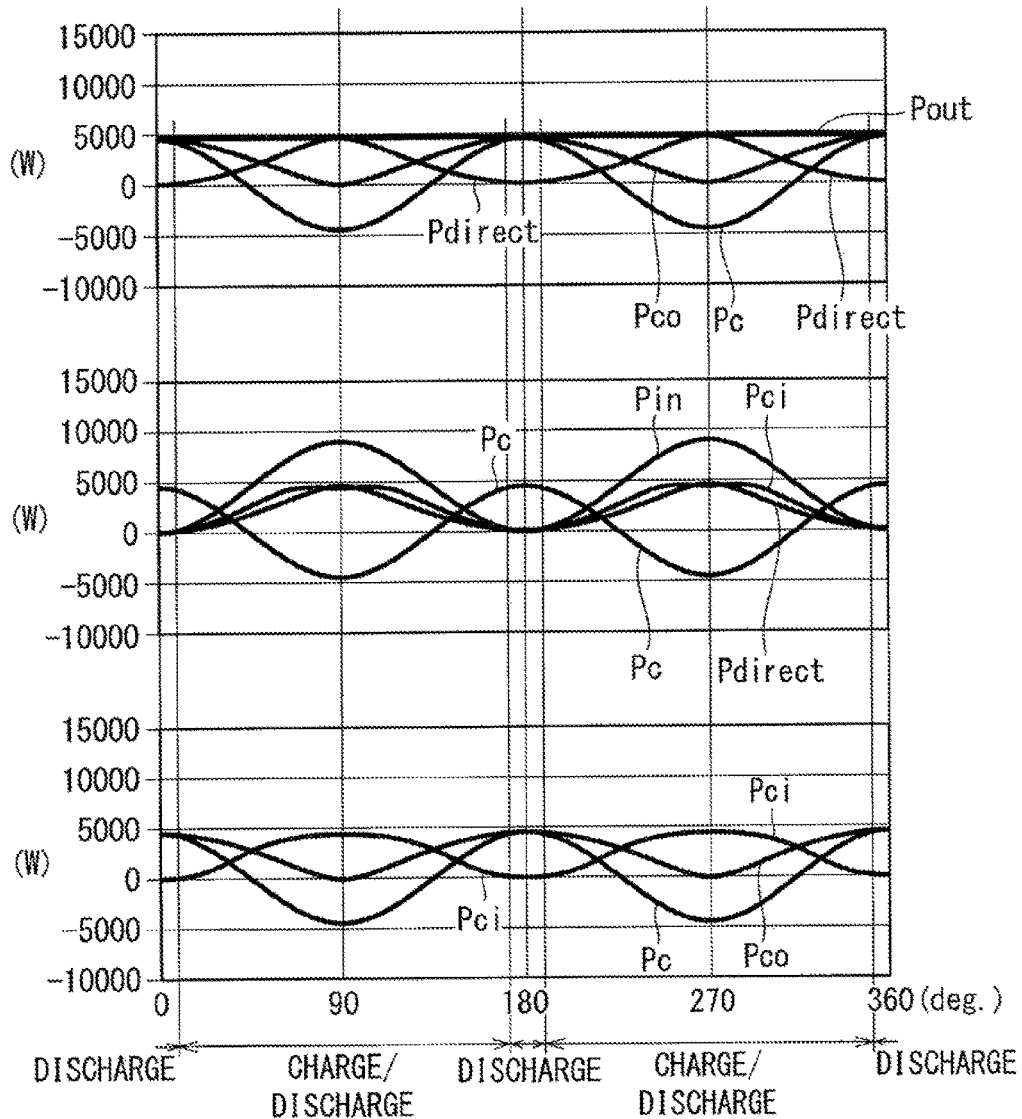
FIG. 17 is a graph showing waveforms of specifications of the example 4.

FIG. 16 and FIG. 17 are graphs showing waveforms of specifications in a case where the control is made by simulation according to the method in this embodiment ("example 4"). Waveforms of specifications corresponding to FIG. 10 and FIG. 11 are respectively shown. It is noted that a case is shown where the crest value of the rectified voltage Vrec is set to 300 V similarly to FIG. 10 to FIG. 11, the virtual DC link voltage Vdc is made to be equal to the crest value of the rectified voltage Vrec, and further the waveform of the rectified current irec is the absolute value of the sinusoidal wave.

When the virtual DC link voltage Vdc is equal to the crest value of the rectified voltage Vrec as that, dc=0 holds only at a time of 90° or 270°. Therefore, FIG. 16 and FIG. 17 do not show the "charge" period.

Further, when the virtual DC link voltage Vdc is smaller than the capacitor voltage Vc, control for making the rectified voltage Vrec always large is enabled. In this case, dc>0 always holds, and there is no case where step S106 is executed as shown in the flowchart of FIG. 5. Surely, since the formula (1) holds, dr<1.

As is understood from the comparison between the examples 1 and 2 and the comparative examples 1 and 2, the control using the method in this embodiment enables the peak value of the electric current ib to flow in the direct AC power converter to be reduced. This contributes to reductions of the loss in the boost chopper 3, and a rated current of the inductor 32.

It is understood from the examples 2, 3, and 4 that the virtual DC link voltage Vdc can be set to $1/\sqrt{2}$ or more times the crest value of the rectified voltage Vrec.

As understood particularly from the comparison between the examples 2 and 3 and the comparative examples 2 and 3, the waveform of the rectified current irec can be the absolute value of the sinusoidal wave. This contributes to the suppression of the power line harmonics.

In the case where the electric power to be discharged from the capacitor 34 in the "discharge" period can be fed by the charge of the capacitor in the "charge/discharge" period, when the virtual DC link voltage Vdc is smaller than the rectified voltage Vrec, the charge of the capacitor 34 may be unnecessary.

The present invention is described in detail, but the above description is the example from all aspects, and thus the invention is not limited to it. It is understood that a lot of modified examples that are not illustrated here can be assumed without departing from the scope of the present invention.

The invention claimed is:

1. A direct AC power converter comprising:
a DC link having a first power supply line and a second power supply line, an electric potential lower than an electric potential of said first power supply line being applied to said second power supply line;
a first rectifying circuit having a plurality of input terminals that input an AC voltage and a pair of output terminals, each of which is connected to said DC link;
an inverter that converts a voltage applied to said DC link into another AC voltage;
a boost chopper having a capacitor at an output stage; and
a switch that switches discharge and non-discharge from said capacitor to said DC link,
wherein in said boost chopper, charge into said capacitor is performed at least at a first period being a part of a period during which a discharge duty as a time ratio of continuity of said switch is larger than 0.

2. The direct AC power converter according to claim 1, wherein said capacitor is charged in said boost chopper at said first period and a part or an entire of the period during which said discharge duty is 0.

3. The direct AC power converter according to claim 2, wherein
said capacitor is charged by a charge power and discharged by a discharge power at said first period, and
said first period has a period during which said charge power is larger than said discharge power, and a period during which said discharge power is larger than said charge power.

4. The direct AC power converter according to claim 1, wherein
a virtual DC link voltage represented by a sum of a product of said discharge duty and a voltage between both ends of said capacitor and a product of a rectifying duty and a rectified voltage of said AC voltage is larger than $1/\sqrt{2}$ times said rectified voltage,
said rectifying duty takes a value obtained by subtracting a sum of said discharge duty and a zero voltage duty from 1,
said zero voltage duty is a time ratio for said inverter to take on a zero voltage vector regardless a magnitude of a voltage output from said inverter.

5. The direct AC power converter according to claim 2, wherein
a virtual DC link voltage represented by a sum of a product of said discharge duty and a voltage between both ends of said capacitor and a product of a rectifying duty and a rectified voltage of said AC voltage is larger than $1/\sqrt{2}$ times said rectified voltage,
said rectifying duty takes a value obtained by subtracting a sum of said discharge duty and a zero voltage duty from 1,
said zero voltage duty is a time ratio for said inverter to take a zero voltage vector regardless a magnitude of a voltage output from said inverter.

6. The direct AC power converter according to claim 4, wherein
said discharge duty that makes said zero voltage duty minimum is set based on a command value of a rectified current being a sum of an electric current flowing in said boost chopper and an electric current flowing from said first rectifying circuit to said inverter, a command value of said virtual DC link voltage, the voltage between both ends of said capacitor, said rectified voltage, and an electric current to be input into said inverter.

7. The direct AC power converter according to claim 5, wherein
said discharge duty that makes said zero voltage duty minimum is set based on a command value of a rectified current being a sum of an electric current flowing in said boost chopper and an electric current flowing from said first rectifying circuit to said inverter, a command value of said virtual DC link voltage, the voltage between both ends of said capacitor, said rectified voltage, and an electric current to be input into said inverter.

8. The direct AC power converter according to claim 6, wherein when said virtual DC link voltage is larger than said rectified voltage and said command value of said rectified current is a predetermined value or more, said rectifying duty takes said-a second predetermined value, and said discharge duty takes a value obtained by subtracting said second predetermined value from 1, said second predetermined value is a value obtained by dividing a value obtained by subtracting said voltage between both ends of said capacitor from said command value of a virtual DC link voltage by a value obtained by subtracting said voltage between both ends from said rectified voltage.

9. The direct AC power converter according to claim 7, wherein when said virtual DC link voltage is larger than said rectified voltage and said command value of said rectified current is a predetermined value or more, said rectifying duty takes said a second predetermined value, and said discharge duty takes a value obtained by subtracting said second predetermined value from 1, and said second predetermined value is a value obtained by dividing a value obtained by subtracting said voltage between both ends of said capacitor from said command value of a virtual DC link voltage by a value obtained by subtracting said voltage between both ends from said rectified voltage.

10. The direct AC power converter according to claim 1, further comprising a second rectifying circuit for inputting a rectified voltage of said AC voltage into said boost chopper.

11. The direct AC power converter according to claim 2, further comprising a second rectifying circuit for inputting a rectified voltage of said AC voltage into said boost chopper.

12. The direct AC power converter according to claim 1, wherein said pair of output terminals of said first rectifying circuit is connected to an input side of said boost chopper.

13. The direct AC power converter according to claim 2, wherein said pair of output terminals of said first rectifying circuit is connected to an input side of said boost chopper.

14. The direct AC power converter according to claim 1, wherein said discharge duty is always positive.

15. The direct AC power converter according to claim 1, further comprising:

a diode connected in parallel with said switch, said diode making a direction of charging said capacitor from said DC link being a forward direction.

16. The direct AC power converter according to claim 2, further comprising:

a diode connected in parallel with said switch, said diode making a direction of charging said capacitor from said DC link being a forward direction.

17. The direct AC power converter according to claim 3, wherein a virtual DC link voltage represented by a sum of a product of said discharge duty and a voltage between both ends of said capacitor and a product of a rectifying duty and a rectified voltage of said AC voltage is larger than $1/\sqrt{2}$ times said rectified voltage, said rectifying duty takes a value obtained by subtracting a sum of said discharge duty and a zero voltage duty from 1, said zero voltage duty is a time ratio for said inverter to take on a zero voltage vector regardless a magnitude of a voltage output from said inverter.

18. The direct AC power converter according to claim 17, wherein said discharge duty that makes said zero voltage duty minimum is set based on a command value of a rectified current being a sum of an electric current flowing in said boost chopper and an electric current flowing from said first rectifying circuit to said inverter, a command value of said virtual DC link voltage, the voltage between both ends of said capacitor, said rectified voltage, and an electric current to be input into said inverter.

19. The direct AC power converter according to claim 18, wherein when said virtual DC link voltage is larger than said rectified voltage and said command value of said rectified current is a predetermined value or more, said rectifying duty takes said a second predetermined value, and said discharge duty takes a value obtained by subtracting said second predetermined value from 1, and said second predetermined value is a value obtained by dividing a value obtained by subtracting said voltage between both ends of said capacitor from the command value of a virtual DC link voltage by a value obtained by subtracting said voltage between both ends from said rectified voltage.

* * * * *

UNITED STATES PATENT AND TRADEMARK OFFICE
CERTIFICATE OF CORRECTION

PATENT NO. : 9,698,699 B2
APPLICATION NO. : 14/431691
DATED : July 4, 2017
INVENTOR(S) : Naoya Yamashita et al.

It is certified that error appears in the above-identified patent and that said Letters Patent is hereby corrected as shown below:

In the Claims

Claim 8, at Column 19, Line 13, change "takes said-a second" to --takes a second--.

Claim 9, at Column 19, Line 27, change "takes said a second" to --takes a second--.

Claim 19, at Column 20, Line 40, change "takes said a second" to --takes a second--.

Signed and Sealed this
Tenth Day of April, 2018

Andrei Iancu
*Director of the United States Patent and Trademark Office*